US011540195B2

(12) United States Patent
Venkataraman et al.

(10) Patent No.: US 11,540,195 B2
(45) Date of Patent: Dec. 27, 2022

(54) CELLULAR ENHANCEMENTS FOR APPLICATION MOBILITY

(71) Applicant: Apple Inc., Cupertino, CA (US)

(72) Inventors: Vijay Venkataraman, Sunnyvale, CA (US); Amitabha Ghosh, Sunnyvale, CA (US); Eyad Al-Shemali, Munich (DE); Franco Travostino, San Jose, CA (US); Jinghua Ling, Palo Alto, CA (US); Lakshmi N. Kavuri, Cupertino, CA (US); Muhammad R. Dar, Milpitas, CA (US); Murtaza A. Shikari, Mountain View, CA (US); Muthukumaran Dhanapal, Dublin, CA (US); Pankaj Subhash Vasandani, Cupertino, CA (US); Ravish Samuel, Livermore, CA (US); Samuel J. Miller, San Jose, CA (US); Shivani Suresh Babu, San Jose, CA (US); Sree Ram Kodali, Sunnyvale, CA (US); Srinivasan Nimmala, San Jose, CA (US); Srirang A. Lovlekar, Cupertino, CA (US); Yifan Zhu, San Jose, CA (US); Irfan Khasim Mohammed, Santa Clara, CA (US); Sofheem Mohammed, Santa Clara, CA (US); Raghuram Mungara, Sunnyvale, CA (US); Vijay Gadde, San Jose, CA (US); Sharad Garg, Cupertino, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/834,028

(22) Filed: Mar. 30, 2020

(65) Prior Publication Data
US 2020/0383027 A1     Dec. 3, 2020

Related U.S. Application Data

(60) Provisional application No. 62/855,620, filed on May 31, 2019.

(51) Int. Cl.
| H04W 36/30 | (2009.01) |
| H04W 76/10 | (2018.01) |
| H04W 24/08 | (2009.01) |
| H04W 36/00 | (2009.01) |

(Continued)

(52) U.S. Cl.
CPC ......... *H04W 36/305* (2018.08); *H04W 24/08* (2013.01); *H04W 36/0022* (2013.01);
(Continued)

(58) Field of Classification Search
CPC ... H04W 36/305; H04W 76/10; H04W 24/08; H04W 36/0022; H04W 36/08;
(Continued)

(56) References Cited

U.S. PATENT DOCUMENTS 8,065,555 B2 * 11/2011 Maiyuran ........... G06F 11/1064
714/6.2
8,549,358 B2 * 10/2013 Yang ...................... H04L 43/55
714/37

(Continued)

FOREIGN PATENT DOCUMENTS

WO     WO2014077753 A1     5/2014
WO     WO-2016007872 A1 *  1/2016  ......... G06Q 30/0201
(Continued)

OTHER PUBLICATIONS

Asoftwarized perspective of the 5G networks by Kleber Vieira Cardoso, Cristiano Bonato Both, Lúcio Rene Prade, Ciro J. A. Macedo, Victor Hugo L. Lopes Cornell University Jun. 2020 (Year: 2020).*

(Continued)

*Primary Examiner* — William D Cumming
(74) *Attorney, Agent, or Firm* — Kowert, Hood, Munyon, Rankin & Goetzel, P.C.

(57) ABSTRACT

Apparatuses, systems, and methods for a wireless device to perform detection and mitigation of data stalls. The mitigation may occur during and/or at initiation of a data connection. The wireless device may establish a data connection(s)

(Continued)

with a network over a Wi-Fi or cellular interface and monitor the data connection(s) for a data stall condition(s)/hint(s). The wireless device may perform a remedial action(s) responsive to detection of a data stall condition(s)/hint(s), including initiating a service recovery of the cellular interface, initiating a radio access technology (RAT) upgrade procedure, and/or initiating a handover procedure to a neighbor cell.

20 Claims, 15 Drawing Sheets

(51) Int. Cl.
  *H04W 36/08* (2009.01)
  *H04W 76/19* (2018.01)
  *H04W 80/12* (2009.01)
(52) U.S. Cl.
  CPC ....... *H04W 36/0094* (2013.01); *H04W 36/08* (2013.01); *H04W 76/10* (2018.02); *H04W 76/19* (2018.02); *H04W 80/12* (2013.01)
(58) Field of Classification Search
  CPC . H04W 36/0094; H04W 76/19; H04W 80/12; H04W 36/30; H04W 76/18; H04W 48/18; H04W 48/20; H04W 88/06; H04W 28/0205; H04W 52/40; H04W 36/0079; H04W 28/0273; H04W 24/02; H04W 36/00837; H04W 8/0273; H04W 16/14; H04W 52/367
  USPC ........ 455/436, 442, 433, 524, 423; 370/394, 370/331, 328, 252
  See application file for complete search history.

(56) References Cited

U.S. PATENT DOCUMENTS

| | | | |
|---|---|---|---|
| 8,964,757 B2 | 2/2015 | Watson | |
| 9,009,260 B2 | 4/2015 | Ewanchuk | |
| 9,113,429 B2* | 8/2015 | Maheshwari | H04W 52/40 |
| 9,414,248 B2 | 8/2016 | Kovvali | |
| 9,535,875 B2* | 1/2017 | Wilson | G06F 13/4295 |
| 9,538,220 B2 | 1/2017 | ElArabawy | |
| 9,756,543 B2 | 9/2017 | Nagaraj | |
| 9,769,723 B2 | 9/2017 | Singh | |
| 9,823,733 B2* | 11/2017 | Wilson | G06F 15/17362 |
| 9,872,338 B2 | 1/2018 | Jechoux | |
| 9,913,189 B2 | 3/2018 | Tinnakornrisuphap | |
| 9,936,428 B2 | 4/2018 | Faccin | |
| 9,985,887 B2* | 5/2018 | Roncero Izquierdo | H04N 21/2401 |
| 9,992,723 B2 | 6/2018 | Katar | |
| 10,070,348 B2 | 9/2018 | Begen | |
| 10,250,655 B2 | 4/2019 | Hurst | |
| 10,324,891 B2* | 6/2019 | Wilson | G06F 13/4295 |
| 10,516,740 B2* | 12/2019 | Prats | H04W 88/06 |
| 10,528,462 B2* | 1/2020 | Ramalingam | G06F 3/0652 |
| 10,686,704 B2* | 6/2020 | Roncero Izquirdo | H04L 47/12 |
| 10,771,188 B2* | 9/2020 | Singh | H04W 88/04 |
| 10,831,700 B2* | 11/2020 | Wilson | G06F 13/4282 |
| 10,893,437 B2* | 1/2021 | Wang | H04W 28/04 |
| 11,277,463 B2* | 3/2022 | Tseng | H04L 67/141 |
| 2002/0082019 A1* | 6/2002 | Su | H04W 52/40 455/442 |
| 2003/0128705 A1* | 7/2003 | Yi | H04L 1/06 370/394 |
| 2007/0226589 A1* | 9/2007 | Maiyuran | G06F 11/1064 714/763 |
| 2009/0061858 A1* | 3/2009 | Rajasimman | H04W 36/0079 455/433 |
| 2009/0316581 A1 | 12/2009 | Kashyap | |
| 2009/0318153 A1* | 12/2009 | Maheshwari | H04L 1/189 455/436 |
| 2011/0281615 A1* | 11/2011 | Yamada | H04L 1/1812 455/524 |
| 2012/0144226 A1* | 6/2012 | Yang | H04L 43/55 714/E11.029 |
| 2013/0021353 A1* | 1/2013 | Drebin | G06T 1/60 345/522 |
| 2013/0171986 A1* | 7/2013 | Shimizu | H04W 76/19 455/423 |
| 2013/0279470 A1* | 10/2013 | Sen | H04W 36/305 370/331 |
| 2014/0019635 A1 | 1/2014 | Reznik | |
| 2014/0044046 A1* | 2/2014 | Vangala | H04W 28/0273 370/328 |
| 2014/0098693 A1* | 4/2014 | Tabet | H04W 36/00837 370/252 |
| 2014/0099941 A1* | 4/2014 | Ji | H04W 16/14 455/423 |
| 2014/0112378 A1* | 4/2014 | Ji | H04L 27/266 375/344 |
| 2014/0181469 A1* | 6/2014 | Wilson | G06F 1/3287 712/29 |
| 2014/0200003 A1* | 7/2014 | Kodali | H04W 52/367 455/436 |
| 2015/0350813 A1* | 12/2015 | Prats | H04L 67/125 709/208 |
| 2016/0029279 A1* | 1/2016 | Bellamkonda | H04W 36/0079 455/436 |
| 2016/0094608 A1 | 3/2016 | Sundararajan | |
| 2016/0156520 A1 | 6/2016 | Scully | |
| 2016/0219458 A1 | 7/2016 | Kubota | |
| 2017/0063692 A1* | 3/2017 | Roncero Izquierdo | H04N 21/2401 |
| 2017/0139468 A1* | 5/2017 | Wilson | G06F 13/4282 |
| 2017/0171319 A1 | 6/2017 | Hall | |
| 2017/0223401 A1 | 8/2017 | Xu | |
| 2017/0264488 A1 | 9/2017 | Ben Ami | |
| 2017/0317894 A1 | 11/2017 | Dao | |
| 2017/0373950 A1 | 12/2017 | Szilagyi | |
| 2018/0074573 A1* | 3/2018 | Wilson | G06F 13/364 |
| 2018/0088810 A1* | 3/2018 | Ramalingam | G06F 3/0659 |
| 2018/0241675 A1* | 8/2018 | Roncero Izquirdo | H04N 21/2401 |
| 2018/0241679 A1 | 8/2018 | Muscariello | |
| 2018/0242218 A1 | 8/2018 | Muscariello | |
| 2018/0255486 A1 | 9/2018 | Kumar | |
| 2019/0069303 A1 | 2/2019 | Yerramalli | |
| 2019/0075493 A1 | 3/2019 | Melander | |
| 2019/0132353 A1 | 5/2019 | Rodniansky | |
| 2019/0215729 A1 | 7/2019 | Oyman | |
| 2019/0268801 A1* | 8/2019 | Wang | H04W 76/16 |
| 2019/0370217 A1* | 12/2019 | Wilson | G06F 13/364 |
| 2019/0372708 A1* | 12/2019 | Singh | H04W 76/19 |
| 2020/0106822 A1* | 4/2020 | Roncero Izquierdo | H04L 65/61 |
| 2020/0260516 A1* | 8/2020 | Kiss | H04W 76/12 |
| 2020/0382576 A1* | 12/2020 | Marshall | H04L 69/18 |
| 2020/0383012 A1* | 12/2020 | Tseng | H04L 69/18 |
| 2020/0383027 A1* | 12/2020 | Venkataraman | H04W 36/0094 |
| 2021/0112446 A1* | 4/2021 | Wang | H04L 47/28 |

FOREIGN PATENT DOCUMENTS

| | | | | |
|---|---|---|---|---|
| WO | WO2017176247 A1 | 10/2017 | | |
| WO | WO2018084663 A1 | 5/2018 | | |
| WO | WO2018125686 A2 | 7/2018 | | |
| WO | WO2020032845 A1 * | 2/2020 | | |
| WO | WO-2020032845 A1 * | 2/2020 | ............ | H04W 24/02 |
| WO | WO-2021026509 A1 * | 2/2021 | ........... | H04N 21/462 |

OTHER PUBLICATIONS

B. Abuhaija and M. Alwakeel, "Performance Evaluation of Service and Power Based Handover Algorithm in Multi Radio Access Technologies," 2013 1st International Conference on Artificial

(56) References Cited

OTHER PUBLICATIONS

Intelligence, Modelling and Simulation, 2013, pp. 428-434, doi: 10.1109/AIMS.2013.78. Nov. 2014 (Year: 2014).*
S. Hadjiefthymiades, S. Papayiannis and L. Merakos, "Using path prediction to improve TCP performance in wireless/mobile communications," in IEEE Communications Magazine, vol. 40, No. 8, pp. 54-61, Aug. 2002, doi: 10.1109/MCOM.2002.1024415. (Year: 2002).*
F. A. Latheef and M. A. Ingale, "On the UE Context Retrieval Enhancements for Improved Inter-RAT Mobility," 2020 IEEE 3rd 5G World Forum (5GWF), 2020, pp. 324-329, doi: 10.1109/5GWF49715.2020.9221422. (Year: 2020).*
C. Xu et al., "A First Look at Disconnection-Centric TCP Performance on High-Speed Railways," in IEEE Journal on Selected Areas in Communications, vol. 38, No. 12, pp. 2723-2733, Dec. 2020, doi: 10.1109/JSAC.2020.3005486. (Year: 2020).*
Wu, Jiyan et al.: "Distortion-Aware Concurrent Multipath Transfer for Mobile Video Streaming in Heterogeneous Wireless Networks"; IEEE Transactions on Mobile Computing, vol. 14, Issue 4; Jul. 8, 2014; 14 pages.

* cited by examiner

| Configuration | | Calls with Video Stall [%] | Calls with Audio Stall [%] | Call Failures [%] |
|---|---|---|---|---|
| Call Initiator | Call Receiver | | | |
| LTE | LTE | 33.5 | 21.6 | 1.2 |
| Non-LTE | LTE | 40.6 | 48.5 | 2.5 |
| LTE | Non-LTE | 51.1 | 17.0 | 2.6 |
| Non-LTE | Non-LTE | 50.7 | 39.4 | 2.2 |
| LTE | Wi-Fi | 33.9 | 24.1 | 1.4 |
| Non-LTE | Wi-Fi | 46.2 | 43.2 | 2.9 |

FIG. 11

CELLULAR ENHANCEMENTS FOR APPLICATION MOBILITY

PRIORITY DATA

This application claims benefit of priority to U.S. Provisional Application Ser. No. 62/855,620, titled "Cellular Enhancements for Application Mobility", filed May 31, 2019, which is hereby incorporated by reference in its entirety as though fully and completely set forth herein.

FIELD

The present application relates to wireless devices, and more particularly to apparatus, systems, and methods for a wireless device to perform a variety of cellular communication techniques.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), BLUETOOTH™, etc. The ever-increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments relate to apparatuses, systems, and methods for a wireless device to detect and mitigate data stalls during a data connection and/or prior to establishment of a data connection with a network.

The techniques described herein may be implemented in and/or used with a number of different types of devices, including but not limited to cellular phones, tablet computers, wearable computing devices, portable media players, and any of various other computing devices.

In some embodiments, a wireless device may perform a method for detecting and/or mitigating data stalls for a data connection. In some embodiments, the method may include the wireless device establishing a data connection(s) with a network. The data connection(s) may be established over a Wi-Fi interface (radio) and/or a cellular interface (radio) of the wireless device. The wireless device may monitor the data connection(s) for a data stall condition(s) and/or a data stall hint(s), including an activation of an upper layer application while a user interface of the wireless device is in a locked state, one or more upper layer applications (e.g., launched/initiated by a user) not receiving one or more network responses to HTTP-GET queries for a specified period of time (e.g., when an application is launched in foreground), a decrease in a size of a buffer being used for media streaming, DNS failures, initiation of an application with a low latency quality of service requirement while on a lower performing cellular connection, loss of a Wi-Fi link servicing the data connection, and/or a broken Wi-Fi backhaul (e.g., connected to a Wi-Fi access point but no valid IP address allocated). The wireless device may perform a remedial action(s) responsive to detection of a data stall condition(s) and/or data stall hint(s), e.g., during and/or at initiating of the data connection(s). The remedial actions may include the wireless device initiating a service recovery of the cellular interface of the wireless device, initiating a radio access technology (RAT) upgrade procedure, and/or initiating a handover and/or re-selection procedure to a neighbor cell. In some embodiments, the remedial action(s) may be based, at least in part, on a cause (or causes) of a data stall condition(s) and/or data stall hint(s), including backhaul server issues, the cellular interface of the wireless device being connected to cell operating according to a lower performing radio access technology (RAT), congestion on a current cell, congestion on a cellular core network, random access channel (RACH) procedure failures, radio link failures (RLFs), and/or initiation of an application with a low latency quality of service requirement while on a lower performing cellular connection.

In some embodiments, a wireless device may perform a method detecting and/or mitigating data stalls for a data connection while on a higher performing radio access technology (RAT). In some embodiments, the method may include the wireless device camping on a cell operating according to a higher performing RAT. In some embodiments, the higher performing RAT may be one of Long Term Evolution (LTE) or Fifth Generation New Radio (5G NR) and the cell may be associated with a first physical cell identifier (PCI). The wireless device may initiate one or more data sessions with a network and monitor the one or more data sessions for a data stall hint and/or data stall condition. The wireless device may, responsive to determining a neighbor cell meets at least one handover condition and detection of a data stall hint and/or data stall condition, initiate a handover and/or re-selection procedure to the neighbor cell.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 11 illustrates various performance values for video calls initiated over LTE versus non-LTE connections.

Figure 1A:
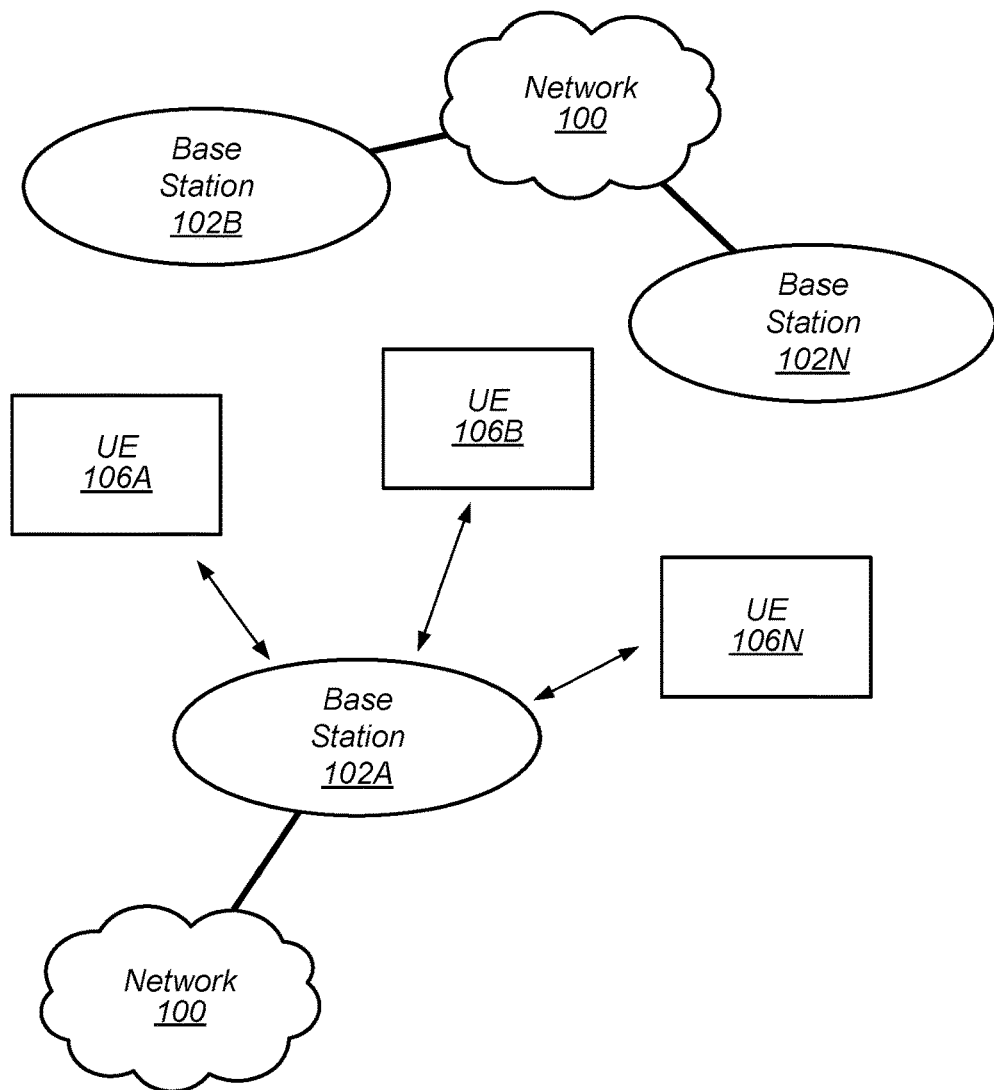
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™ Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

HTTP Transaction—The term "HTTP transaction" may refer to an exchange between an HTTP client (requester) and an HTTP server (responder). For example, the exchange may include the HTTP client transmitting (or sending) an HTTP request, such as an HTTP-GET query, to the HTTP server and receiving (from the HTTP server) an HTTP response, e.g., a response to the HTTP-GET query. A failure of an HTTP transaction may include the HTTP client not receiving a response from the HTTP server, receiving an incomplete response from the HTTP server, and/or not receiving a response within a specified period of time (e.g., a timeout period). HTTP transactions may occur over transmission control protocol (TCP) connections as well as an encrypted byte stream (e.g., a transport layer security (TLS) protocol connection) occurring over top of the TCP connection. Additionally, HTTP transactions may occur over transport connections that do not use TCP, e.g., such as quick user data protocol (UDP) internet connection (QUIC), which provides reliable encrypted byte streams over UDP datagrams.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
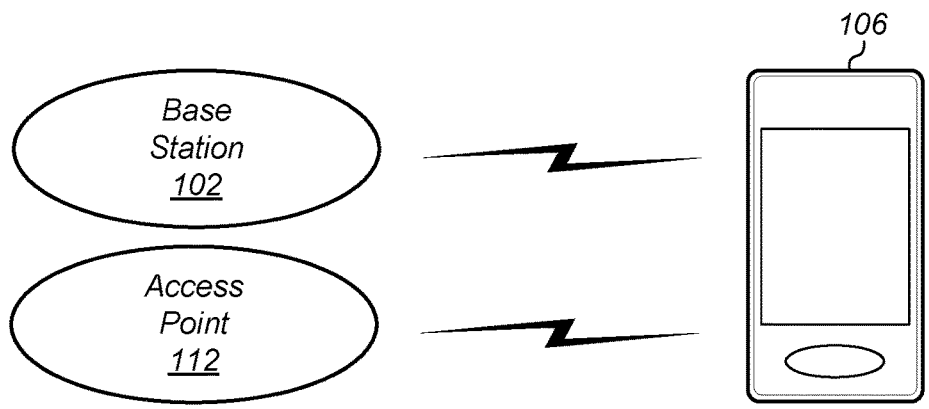
FIG. 1B illustrates an example of a base station (BS) and an access point in communication with a user equipment (UE) device according to some embodiments.

FIGS. 1A and 1B—Communication Systems

FIG. 1A illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
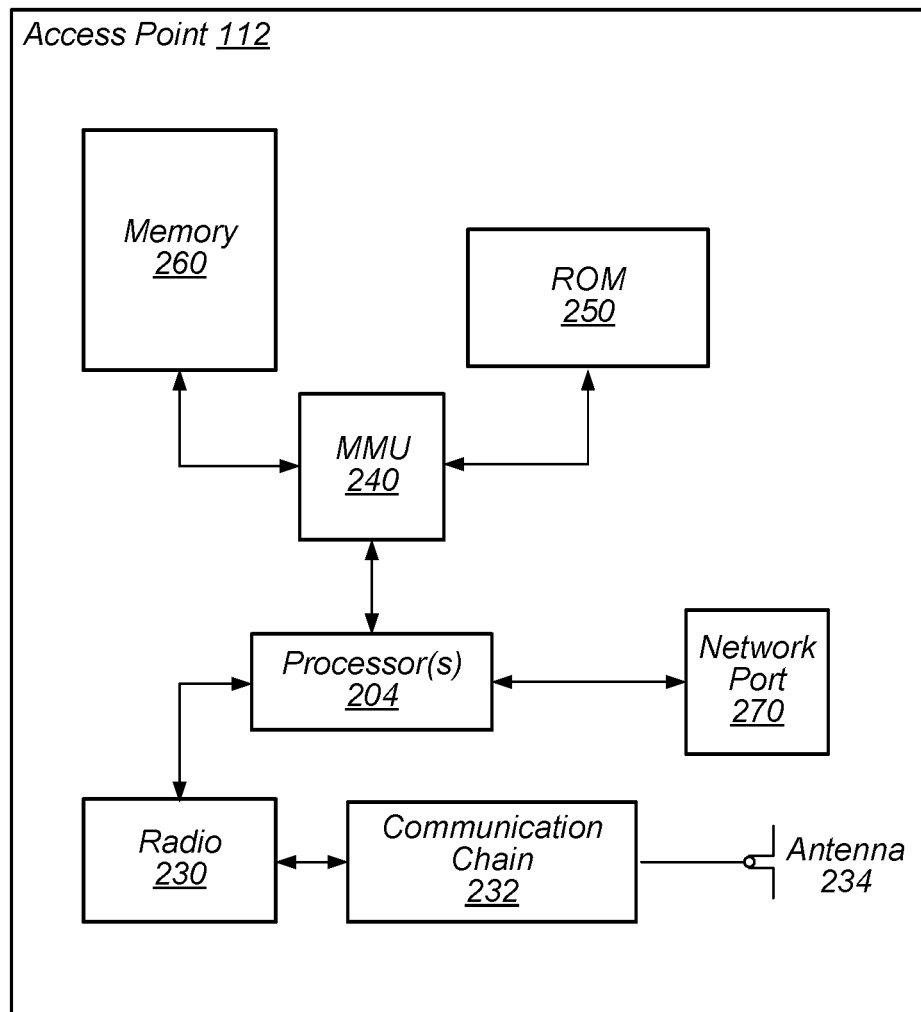
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as UEs 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with UE 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, 5G NR, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, an AP 112 may be configured to implement methods for a wireless device to detect and/or mitigate data stalls during a data connection and/or prior to establishment of a data connection, e.g., as further described herein.

Figure 3:
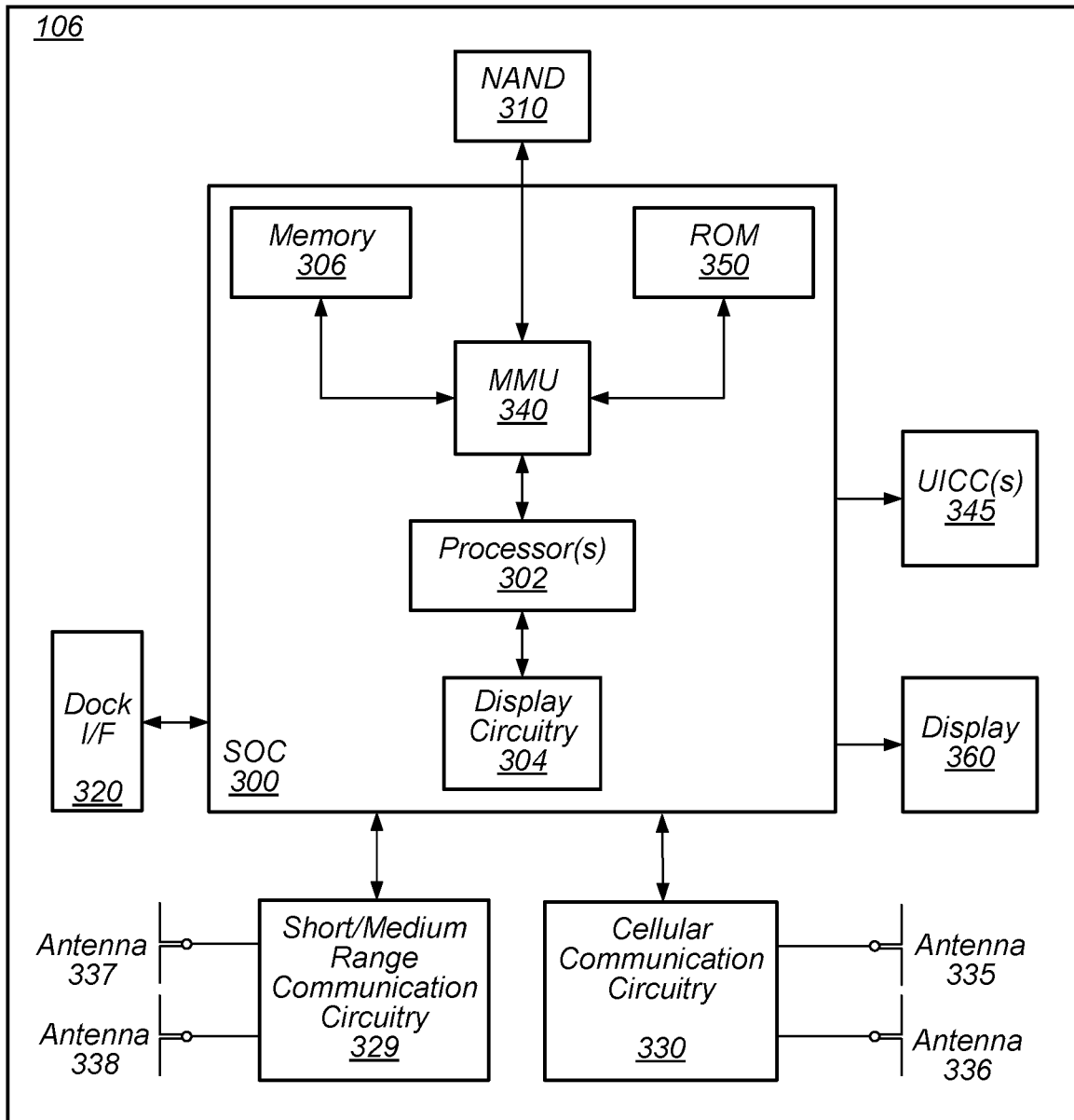
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 329, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform methods for detecting and/or mitigating data stalls during a data connection and/or prior to establishment of a data connection with a network, e.g., as further described herein.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short-range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short-range wireless communication circuitry 329 may include one or more ICs that are configured to perform the functions of short-range wireless communication circuitry 329. In addition, each integrated circuit may include circuitry (e.g., first circuitry, second circuitry, etc.) configured to perform the functions of short-range wireless communication circuitry 329.

Figure 4:
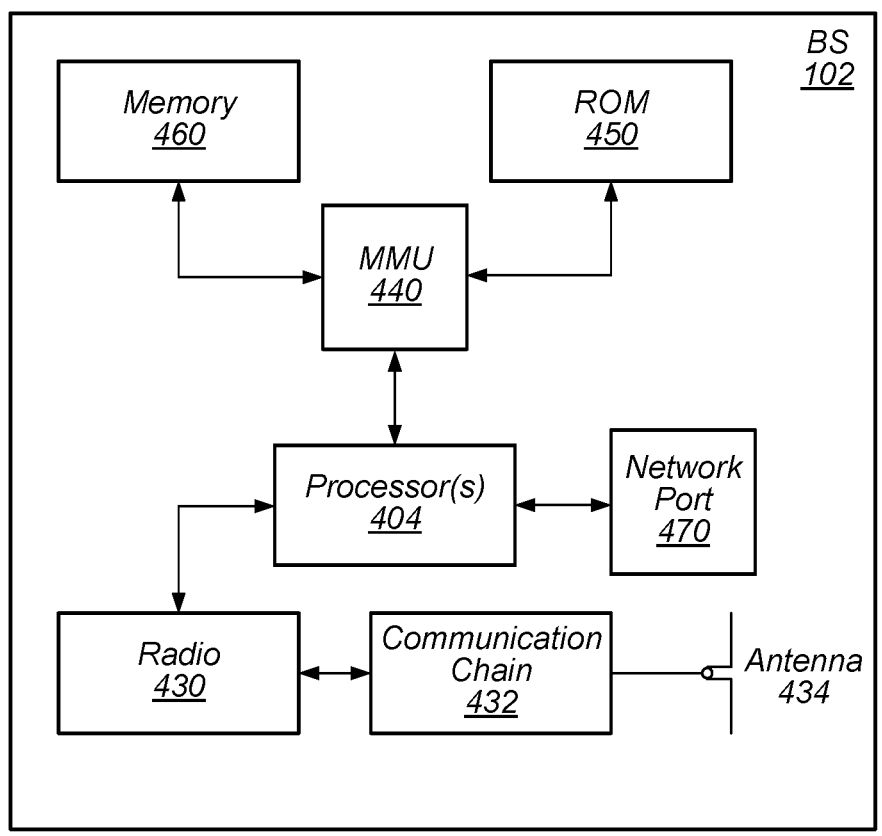
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC and/or 5GC) network. In addition, base station 102 may be considered a 5G NR cell and may include one or more transmission and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein, e.g., for configuring a power savings signal in fifth generation (5G) new radio (NR) networks. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
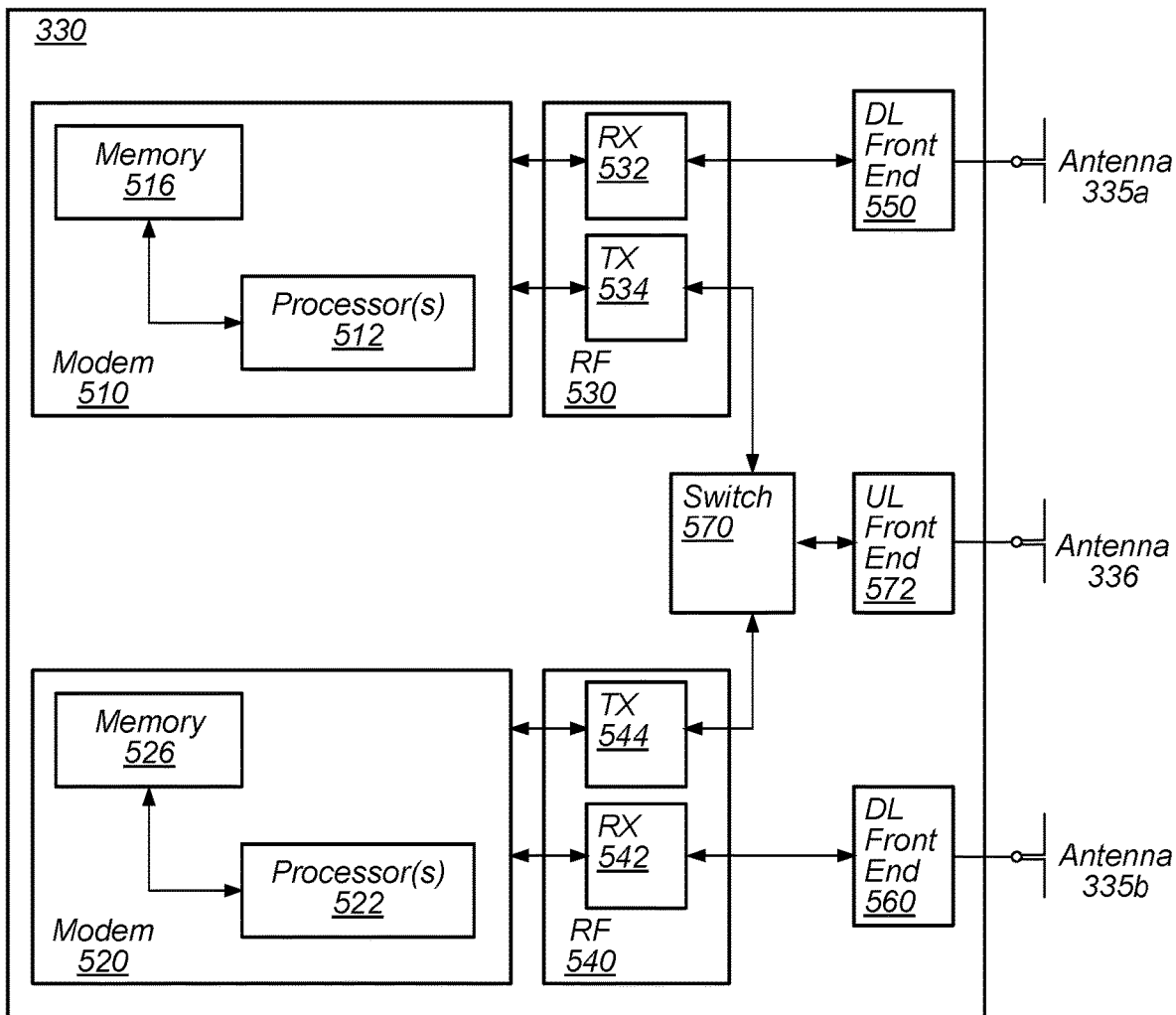
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a*-*b* and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to perform methods for detecting and/or mitigating data stalls during a data connection and/or prior to establishment of a data connection with a network, e.g., as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

5G NR Architecture with LTE

Figure 6A:
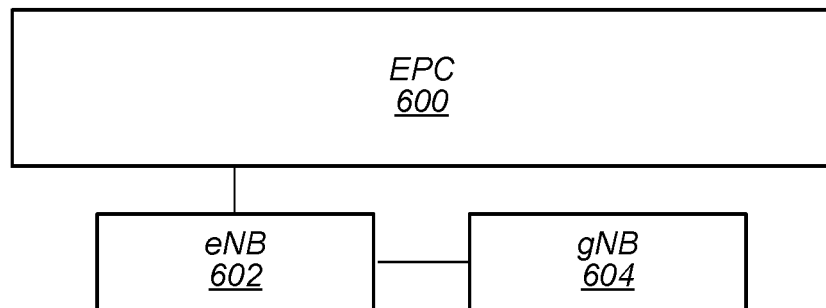
FIG. 6A illustrates an example of connections between an EPC network, an LTE base station (eNB), and a 5G NR base station (gNB).
Figure 6B:
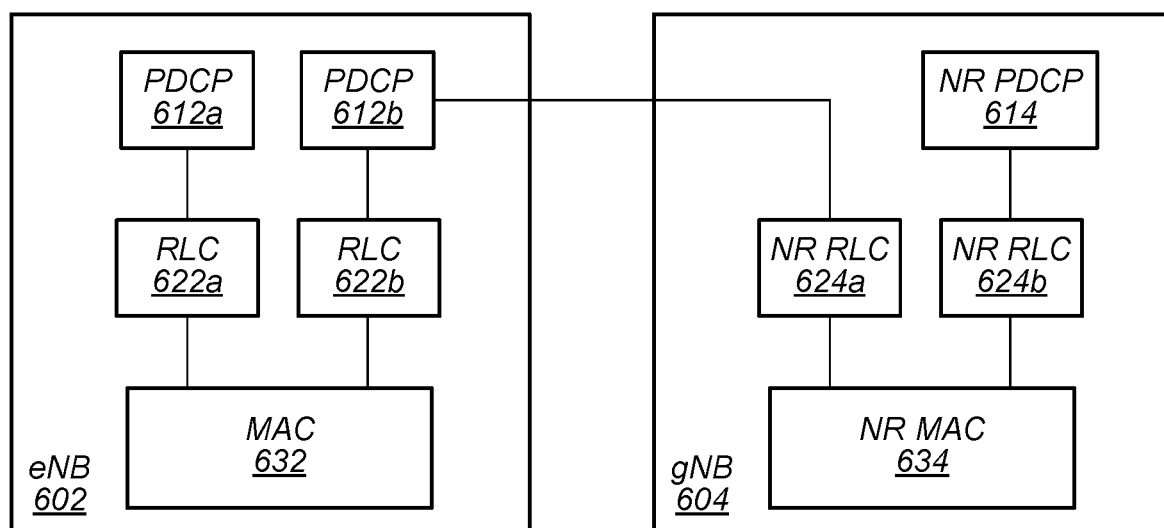
FIG. 6B illustrates an example of a protocol stack for an eNB and a gNB.

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user (or data) plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622*a-b*. RLC layer 622*a* may also interface with packet data convergence protocol (PDCP) layer 612*a* and RLC layer 622*b* may interface with PDCP layer 612*b*. Similar to dual connectivity as specified in LTE-Advanced Release 12, PDCP layer 612*a* may interface via a master cell group (MCG) bearer to EPC network 600 whereas PDCP layer 612*b* may interface via a split bearer with EPC network 600.

Additionally, as shown, gNB 604 may include a MAC layer 634 that interfaces with RLC layers 624*a-b*. RLC layer 624*a* may interface with PDCP layer 612*b* of eNB 602 via an X2 interface for information exchange and/or coordination (e.g., scheduling of a UE) between eNB 602 and gNB 604. In addition, RLC layer 624*b* may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

5G Core Network Architecture—Interworking with Wi-Fi

Figure 7A:
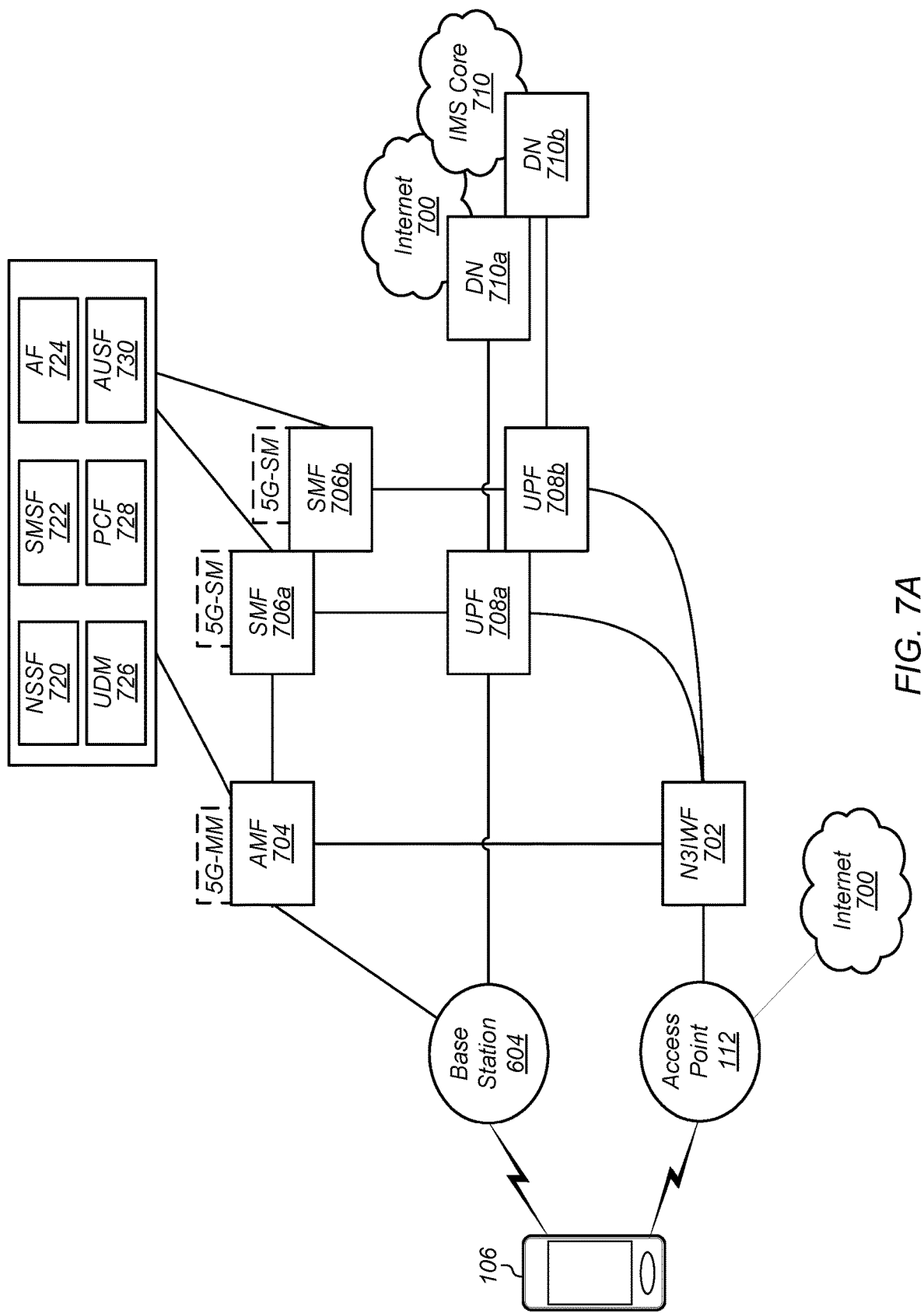
FIG. 7A illustrates an example of a 5G network architecture that incorporates both 3GPP (e.g., cellular) and non-3GPP (e.g., non-cellular) access to the 5G CN, according to some embodiments.

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 7A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB or base station 604) and an access point, such as AP 112. The AP 112 may include a connection to the Internet 700 as well as a connection to a non-3GPP inter-working function (N3IWF) 702 network entity. The N3IWF may include a connection to a core access and mobility management function (AMF) 704 of the 5G CN. The AMF 704 may include an instance of a 5G mobility management (5G MM) function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. As shown, the AMF 704 may include one or more functional entities associated with the 5G CN (e.g., network slice selection function (NSSF) 720, short message service function (SMSF) 722, application function (AF) 724, unified data management (UDM) 726, policy control function (PCF) 728, and/or authentication server function (AUSF) 730). Note that these functional entities may also be supported by a session management function (SMF) 706*a* and an SMF 706*b* of the 5G CN. The AMF 706 may be connected to (or in communication with) the SMF 706*a*. Further, the gNB 604 may in communication with (or connected to) a user plane function (UPF) 708*a* that may also be communication with the SMF 706*a*. Similarly, the N3IWF 702 may be communicating with a UPF 708*b* that may also be communicating with the SMF 706*b*. Both UPFs may be communicating with the data network (e.g., DN 710*a* and 710*b*) and/or the Internet 700 and IMS core network 710.

Figure 7B:
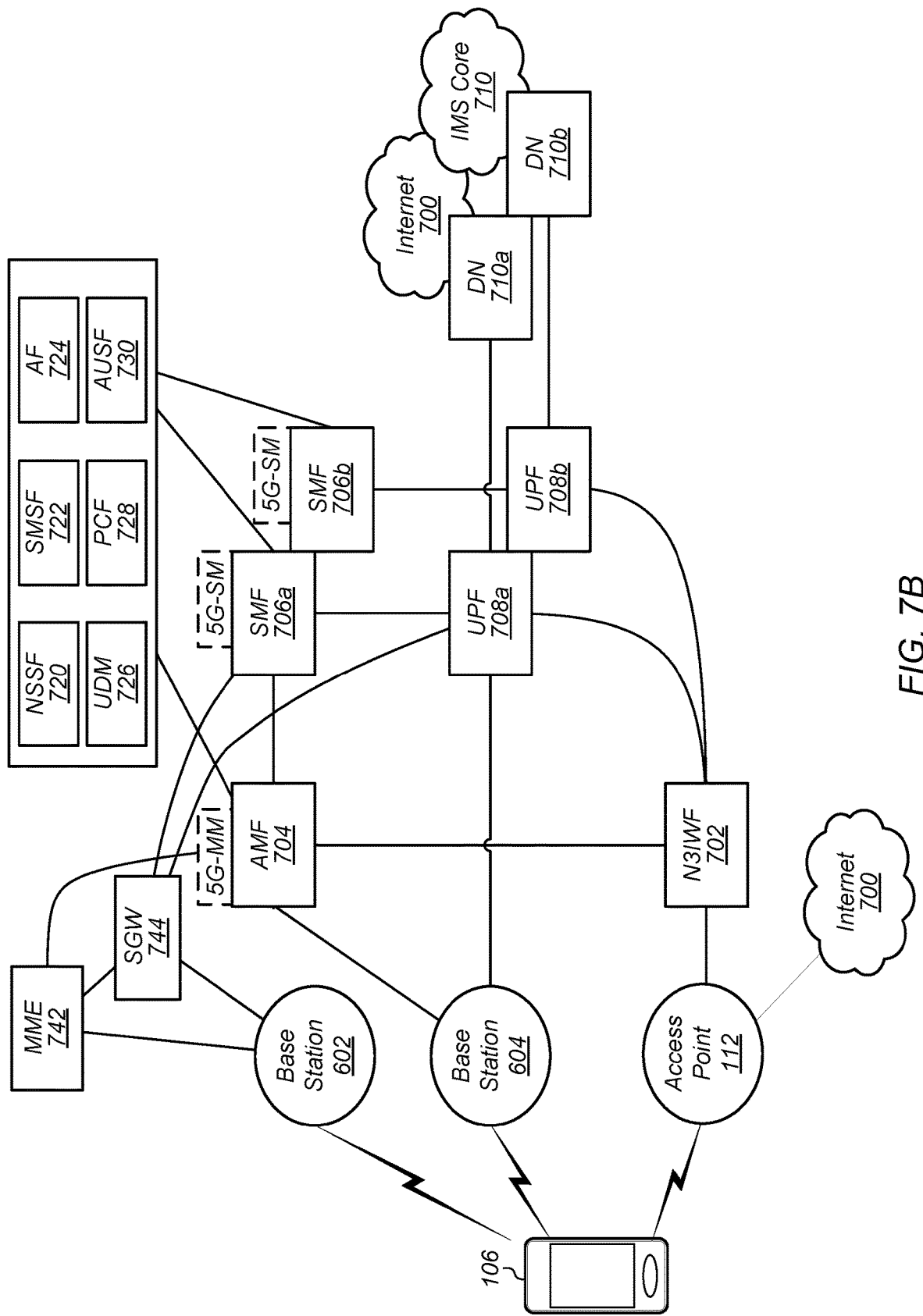
FIG. 7B illustrates an example of a 5G network architecture that incorporates both dual 3GPP (e.g., LTE and 5G NR) access and non-3GPP access to the 5G CN, according to some embodiments.

FIG. 7B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB or base station 604 or eNB or base station 602) and an access point, such as AP 112. The AP 112 may include a connection to the Internet 700 as well as a connection to the N3IWF 702 network entity. The N3IWF may include a connection to the AMF 704 of the 5G CN. The AMF 704 may include an instance of the 5G MM function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. In addition, the 5G CN may support dual-registration of the UE on both a legacy network (e.g., LTE via base station 602) and a 5G network (e.g., via base station 604). As shown, the base station 602 may have connections to a mobility management entity (MME) 742 and a serving gateway (SGW) 744. The MME 742 may have connections to both the SGW 744 and the AMF 704. In addition, the SGW 744 may have connections to both the SMF 706*a* and the UPF 708*a*. As shown, the AMF 704 may include one or more functional entities associated with the 5G CN (e.g., NSSF 720, SMSF 722, AF 724, UDM 726, PCF 728, and/or AUSF 730). Note that UDM 726 may also include a home subscriber server (HSS) function and the PCF may also include a policy and charging rules function (PCRF). Note further that these functional entities may also be supported by the SMF 706a and the SMF 706b of the 5G CN. The AMF 706 may be connected to (or in communication with) the SMF 706a. Further, the gNB 604 may in communication with (or connected to) the UPF 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Note that in various embodiments, one or more of the above described network entities may be configured to perform methods for a wireless device to detect and/or mitigate data stalls during a data connection and/or prior to establishment of a data connection with a network, e.g., as further described herein.

Figure 8:
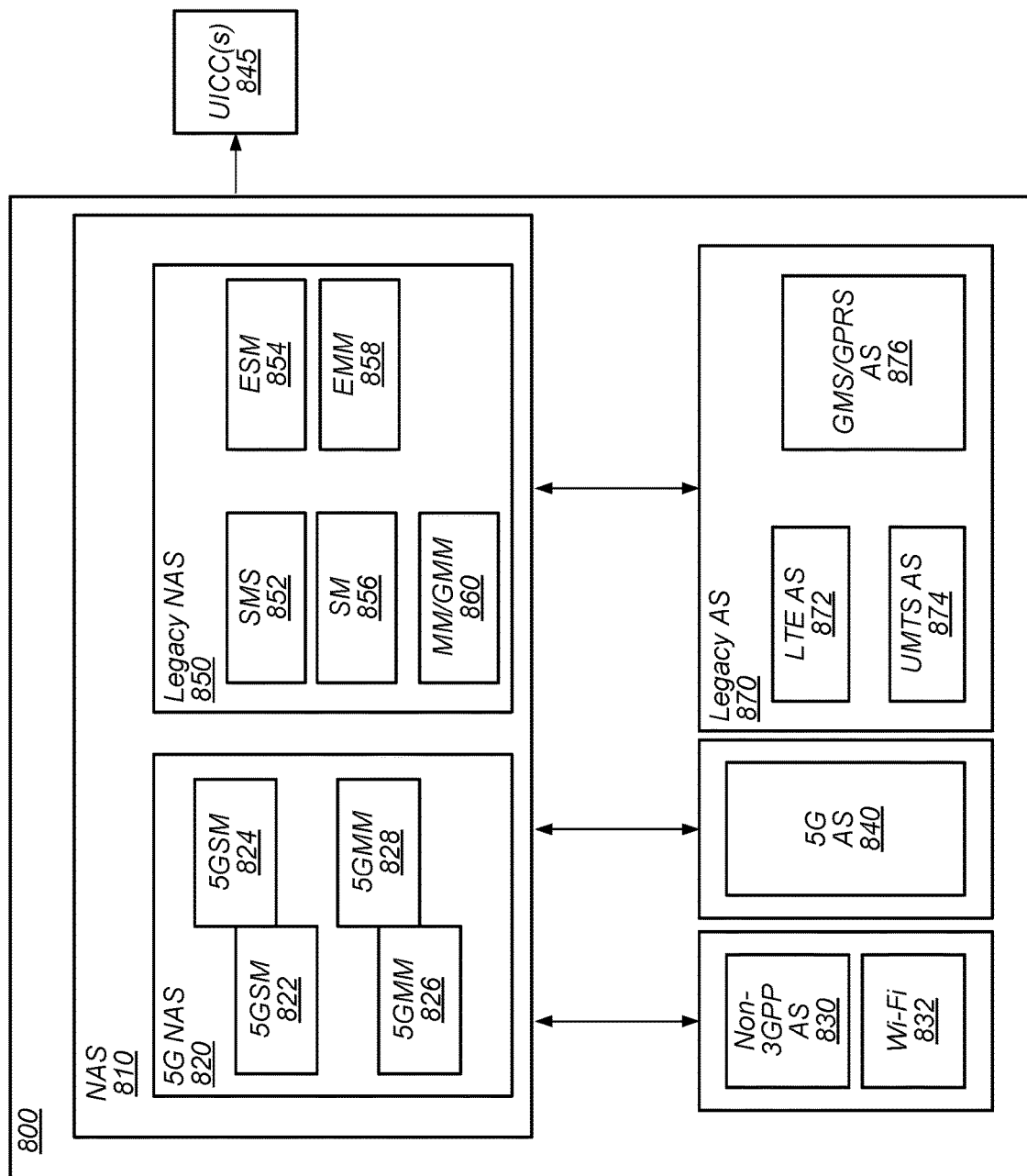
FIG. 8 illustrates an example of a baseband processor architecture for a UE, according to some embodiments.

FIG. 8 illustrates an example of a baseband processor architecture for a UE (e.g., such as UE 106), according to some embodiments. The baseband processor architecture 800 described in FIG. 8 may be implemented on one or more radios (e.g., radios 329 and/or 330 described above) or modems (e.g., modems 510 and/or 520) as described above. As shown, the non-access stratum (NAS) 810 may include a 5G NAS 820 and a legacy NAS 850. The legacy NAS 850 may include a communication connection with a legacy access stratum (AS) 870. The 5G NAS 820 may include communication connections with both a 5G AS 840 and a non-3GPP AS 830 and Wi-Fi AS 832. The 5G NAS 820 may include functional entities associated with both access stratums. Thus, the 5G NAS 820 may include multiple 5G MM entities 826 and 828 and 5G session management (SM) entities 822 and 824. The legacy NAS 850 may include functional entities such as short message service (SMS) entity 852, evolved packet system (EPS) session management (ESM) entity 854, session management (SM) entity 856, EPS mobility management (EMM) entity 858, and mobility management (MM)/ GPRS mobility management (GMM) entity 860. In addition, the legacy AS 870 may include functional entities such as LTE AS 872, UMTS AS 874, and/or GSM/GPRS AS 876.

Thus, the baseband processor architecture 800 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described elements may be configured to perform methods to implement mechanisms for detecting and/or mitigating data stalls during a data connection and/or prior to establishment of a data connection with a network, e.g., as further described herein.

Cellular Enhancements for Application Mobility

In some existing implementations, when a mobile station, or UE, transitions out of Wi-Fi coverage, the mobile station may experience a data stall condition, e.g., a no response condition to an HTTP-GET query, a common HTTP method used to request data from a specified resource. For example, a data stall condition may occur when a mobile station transitions between Wi-Fi networks (e.g., Wi-Fi roaming), transitions from a Wi-Fi network to a cellular network, and/or transitions between cells of a cellular network. Further, during a data stall condition, a web service may hang, e.g., a webpage may not load in a web browser or a map may not refresh in a web mapping service application. As another example, streaming music or streaming video playback may pause during playback during a data stall condition. Additionally, in a data stall condition, a real-time audio-visual call may be missed, dropped, and/or paused. As a further example, an email message may not load during a data stall condition.

Additionally, in some existing implementations, recovery from a data stall condition, e.g., such as transitioning to or recovering to cellular service, may be delayed because existing cellular service recovery algorithms are periodic timer based and are not aware of a UE's Wi-Fi association status. For example, in some instances a cellular service recovery when camped in limited service may be attempted once every two minutes. In some other instances, a cellular service recovery when camped in limited service may be attempted once every six minutes. Similarly, in some instances, an out of service recovery may be attempted once every minute.

Furthermore, as more utilities are accessed with a mobile station in a locked state (e.g., a state in which a user interface of the mobile station has limited capabilities as compared to an unlocked state), such data stall conditions have become more prominent and recovery slowed due to a baseband processor of the mobile station being in a limited service and/or out of service state. Additionally, in some implementations, recovery may be slowed due to the baseband processor falling back to a slower than optimal RAT prior to the data stall condition occurring.

In addition, in some implementations, when a Wi-Fi link is lost (e.g., disconnected or broken backhaul detection), the baseband processor may be in a "sub-optimal" state. For example, the baseband processor may be in an out of service or limited service state. In some instances, the baseband processor may have fallen back to a slower than optimal RAT (e.g., 1x or DO).

In some embodiments, one or more actions may be performed in the above instances to initiate an immediate service recovery of a cellular interface and/or upgrade a cellular connection to a higher performing RAT (e.g., to LTE and/or 5G NR). For example, an application (and/or application/traffic monitor) may notify (and/or inform) a baseband processor when an application is activated with a user equipment device (UE), such as UE 106, in a locked state. Such notification may trigger the baseband processor to attempt an immediate service recovery if the baseband processor/cellular interface is in an out of service or limited service state. In such embodiments, existing periodic timers may continue to run if service is not found. As another example, if a Wi-Fi link is lost, a cellular interface may be elevated to primary rank for data traffic. Such a trigger may cause a baseband processor in a lower performing state (e.g., out of service, limited service, and/or attached to a lower performing (or slower than optimal) RAT) to attempt an immediate service recovery, including frequency list scans, and/or to attempt to upgrade to a higher performing RAT (e.g., such as LTE and/or 5G NR). In some embodiments, when primary rank for data traffic changes (or switches) from Wi-Fi to cellular, the baseband processor (and/or cellular interface) may attempt to be in (and/or transition to)

a higher performing state (e.g., have an active connection with an LTE and/or 5G NR cell).

In some embodiments, an application (and/or traffic monitor) may collect information related to data stalls and/or prediction of data stalls and may send (or notify) a baseband processor of a UE, such as UE 106, the collected information. In some embodiments, the collected information may include aggregated data stall hints, e.g., multiple foreground applications encountering data stalls (e.g., not receiving network responses to HTTP-GET queries). In some embodiments, the collected information may include pre-warnings from a media stack/layer (or application) (e.g., core media detects a decrease in buffer size indicating a possible data stall). In some embodiments, such pre-warnings may indicate an imminent data stall. In some embodiments, the collected information may include DNS failures.

In some embodiments, a media stack/layer (or application) may set an interface (or software entity/layer) to assert an emergency deadline, e.g., a signaling time to an emergency, where an emergency may be, for example, a data stall condition and/or an unreasonably long startup delay. In some embodiments, the media stack/layer may set, update, and or clear emergency deadlines. In some embodiments, an emergency deadline may be set per task and/or tasks may be grouped based, at least in part, on a shared connection pool. In some embodiments, each time an emergency deadline associated with a connection pool is changed, the interface may determine (or calculate) a next occurring emergency deadline and may set (and/or clear) the next occurring emergency deadline. In some embodiments, the interface may share the emergency deadlines as well as connection UUID with other layers (e.g., such as MPTCP) and/or software entities. In other words, the interface may inform other layers of the emergency deadlines and/or the connection UUID. In some embodiments, an MPTCP layer may use emergency deadlines to determine (or decide) when to establish sub flows. In some embodiments, a software entity may use the emergency deadlines to schedule a Reliable Network Fallback (RNF), a Wi-Fi roaming scan(s), and/or a RAT upgrade procedure.

Figure 9:
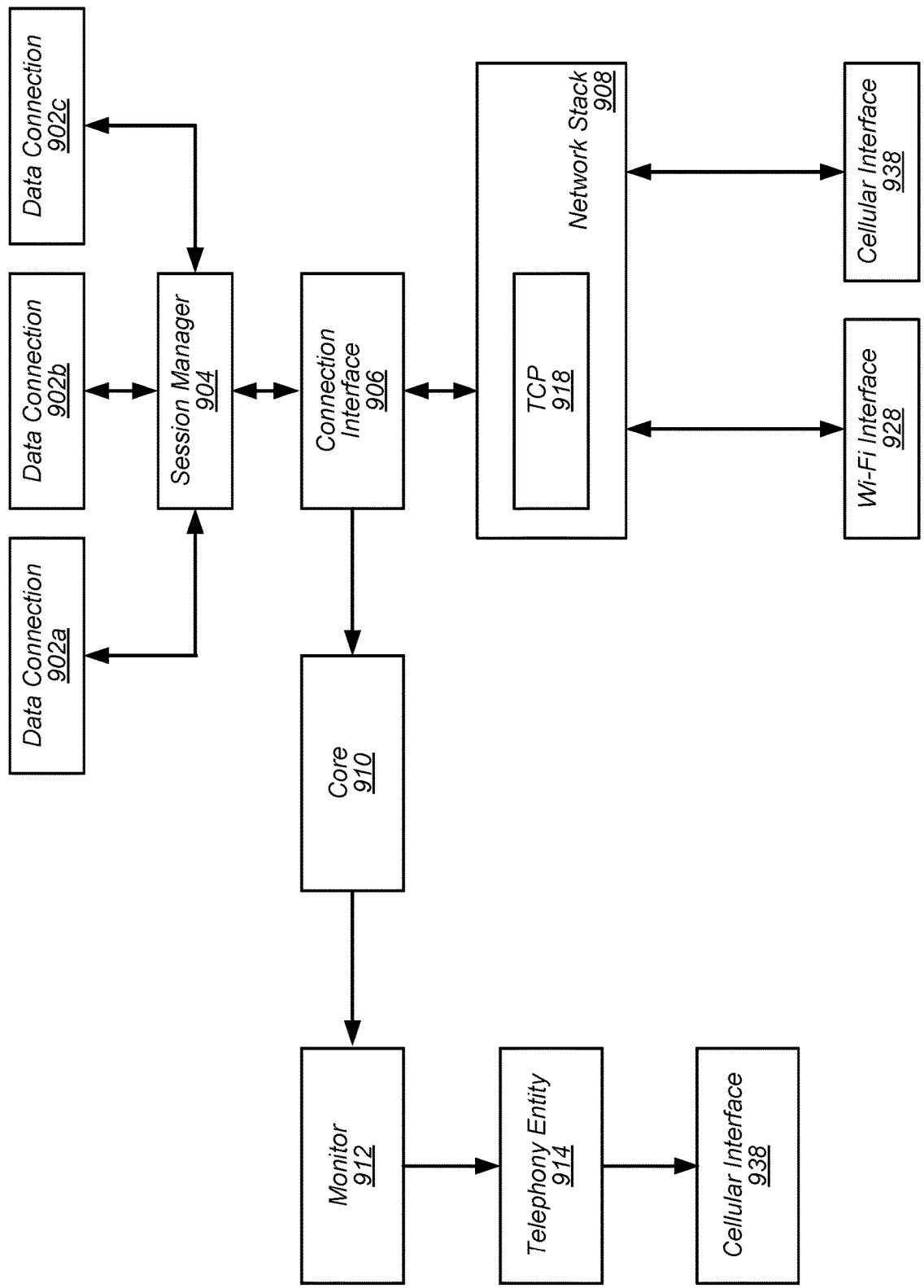
FIG. 9 illustrates a block diagram of an example of an architecture for data stall handling, according to some embodiments.

For example, FIG. 9 illustrates a block diagram of an example of an architecture for data stall handling, according to some embodiments. The architecture shown in FIG. 9 may be used in conjunction with (or implemented with) any of the systems or devices shown in the above Figures, among other devices. In various embodiments, some of the elements shown may be omitted. Additional elements may also be used as desired. As shown, this architecture may operate as follows.

As shown, a connection manager 904 (e.g., a software entity, a layer of the communication architecture, and/or an application) may monitor various data connections 902*a-c*. The data connections 902*a-c* may be for various upper layer (foreground) applications such as an internet browser, an email application, and/or various other upper layer applications that may not require low latency data connections. The connection manager 904 may interface and communicate with a connection interface (or connection core layer) 906. The connection interface 906 may manage HTTP connections (e.g., serving the data connections 902*a-c*). Additionally, the connection manager 906 may monitor responses to HTTP_GET requests, e.g., via communications with network stack (or layer) 908. Network stack 908 may include a TCP layer 918 (or more generally, a transport layer supporting HTTP transactions over TCP and/or UDP connections) and may interface with Wi-Fi interface (or layer) 928 and/or cellular interface (or layer) 938. Thus, connection requests from data connections 902*a-c* may flow from the connection manager 904 to one of the Wi-Fi interface 928 or cellular interface 938 (e.g., depending on which interface is a primary interface for data) via the connection interface 906 and the network stack 908.

The connection interface 906 may communicate HTTP_GET request responses to core (layer) 910 (e.g., a software entity, a layer of the communication architecture and/or an application). Core 910 may report HTTP response header timeouts to monitoring entity 912. Monitoring entity 912 may monitor HTTP response header timeouts on a per upper layer application basis. In other words, monitoring entity 912 may monitor HTTP response header timeouts for each data connection (e.g., each of data connections 902*a-c*). In some embodiments, the monitoring entity 912 may track a number of HTTP response header timeouts per time period. In other words, the monitoring entity 912 may track a number of HTTP response header timeouts for a given time period. Further, when the number of HTTP response header timeouts exceeds a threshold for a time period, the monitoring entity 912 may notify telephony entity 914 of the condition. In such instances, telephony entity 914 may report an aggregated data stall hint to cellular interface 938 (e.g., a cellular baseband processor). Upon receiving the aggregated data stall hint, cellular interface 938 may take one or more actions as described herein.

For example, the cellular interface 938 may attempt an immediate service recovery if the cellular interface 938 is in an out of service or limited service state. In such embodiments, existing periodic timers may continue to run if service is not found. As another example, the cellular interface 938 may attempt to upgrade to a more optimal RAT (e.g., such as LTE and/or 5G NR). As a further example, the cellular interface 938 may de-prioritize a current cell (e.g., a current LTE and/or 5G NR cell) and attempt to handover (or move) to a better (or best) performing neighbor cell (e.g., a neighbor LTE and/or neighbor 5G NR cell).

In some embodiments, which action the cellular interface 938 chooses may be based, at least in part, on a cause of a data stall. For example, cellular interface 938 may attempt an immediate service discovery based, at least in part, on a data stall being caused by backhaul server issues (e.g., no radio issues detected). As another example, cellular interface 938 may attempt a RAT upgrade based, at least in part, on a data stall being caused by the cellular interface 938 being connected to a lower performing RAT. As a further example, cellular interface 938 may attempt a handover to a neighbor cell based, at least in part, on a data stall being caused by radio congestion on a current cell (e.g., a current LTE and/or 5G NR cell) and/or congestion on a cellular core network.

In some embodiments, once the cellular interface 938 receives the aggregated data stall hint (or more generally, a data stall hint), the cellular interface 938 may ignore (or disregard) additional data stall hints for a time period. In other words, to guard against multiple back to back data stall hints, the cellular interface 938 may use (or have) a backoff timer that may be initiated upon receipt of a data stall hint. Thus, any subsequent data stall hint received prior to expiration of the backoff timer may be ignored (or disregarded). For example, in some embodiments, the cellular interface 938 may ignore subsequent data stall hints for 30 seconds (or 1 minute, 2 minutes, and so forth) upon receipt of a data stall hint.

Figure 10:
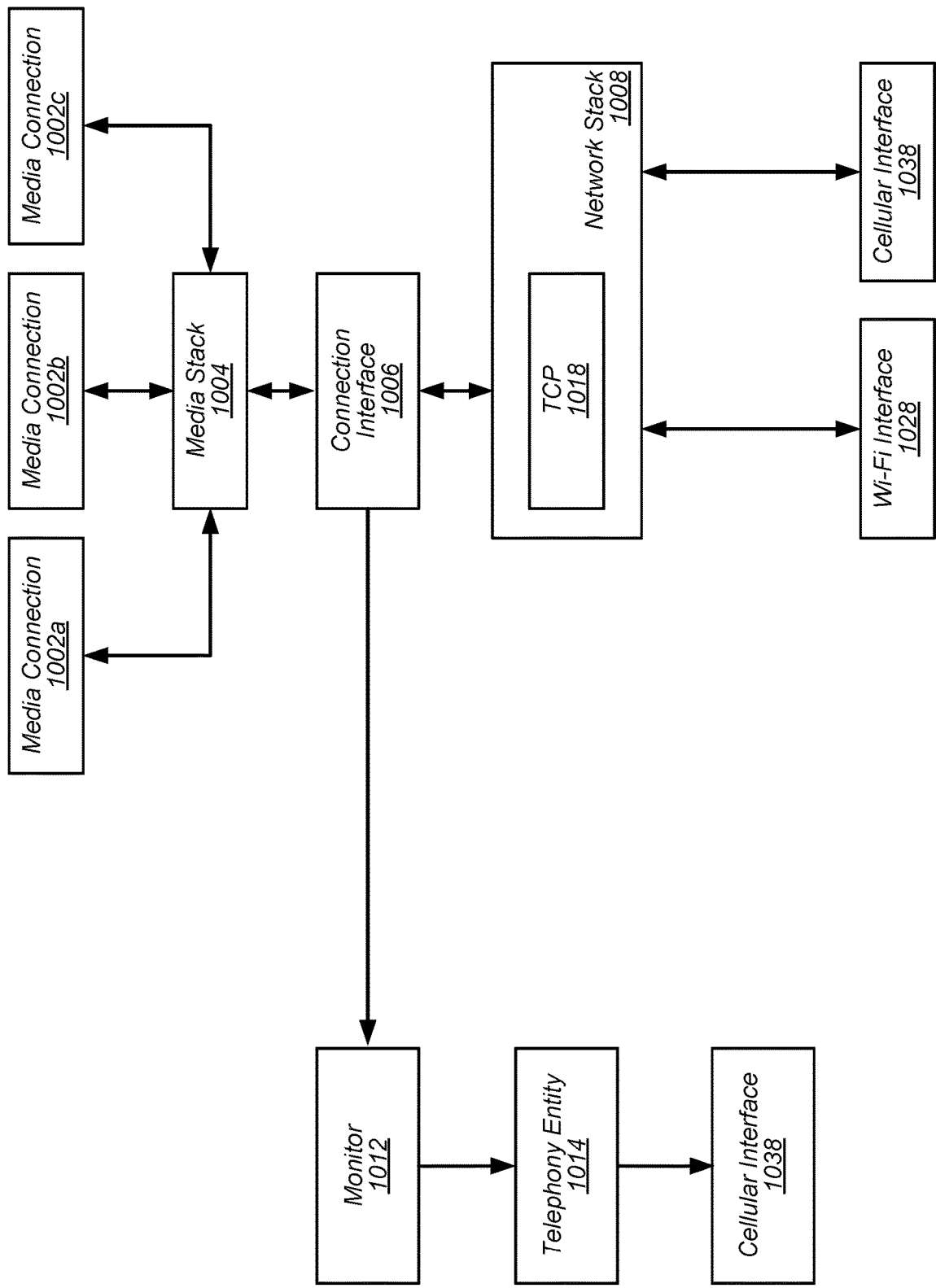
FIG. 10 illustrates a block diagram of an example of an architecture for data stall pre-emption, according to some embodiments.

As another example, FIG. 10 illustrates a block diagram of an example of an architecture for data stall pre-emption, according to some embodiments. The architecture shown in FIG. 10 may be used in conjunction with (or implemented with) any of the systems or devices shown in the above Figures, among other devices. In various embodiments, some of the elements shown may be omitted. Additional elements may also be used as desired. As shown, this architecture may operate as follows.

As shown, media stack 1004 (e.g., a software entity, a layer of the communication architecture, and/or an application) may monitor various media (e.g., streaming content such as video and/or music) connections 1002a-c. The media connections 1002a-c may be for various upper layer (foreground) applications such as a streaming music service and/or a streaming video service and/or various other upper layer applications that may require low latency data connections. Media stack 1004 may interface and communicate with a connection interface (or connection core) 1006. The connection interface (or layer) 1006 may manage media protocol connections (e.g., serving the media connections 1002a-c). Additionally, the connection interface 1006 may monitor responses to media protocol requests, e.g., via communications with network stack (or layer) 1008. Network stack 1008 may interface with Wi-Fi interface (or layer) 1028 and/or cellular interface (or layer) 1038. Thus, connection requests from media connections 1002a-c may flow from media stack 1004 to one of the Wi-Fi interface 1028 or cellular interface 1038 via the connection interface 1006 and the network stack 1008.

In addition, the connection interface 1006 may receive emergency deadline information (e.g., an amount of time of buffered data) from media stack 1004. The connection interface may pass the emergency deadline information to monitoring entity 1012. Monitoring entity 1012 may monitor the emergency deadline information on a per upper layer application basis. In other words, monitoring entity 1012 may monitor emergency deadline information for each media connection (e.g., each of media connections 1002a-c). In some embodiments, the monitoring entity 1012 may provide (or inform) telephony entity 1014 with media pre-warnings (e.g., an imminent media stall hint) any time an emergency deadline (e.g., an amount of time of buffered data) drops below a threshold. In some embodiments, the threshold may a time amount, such as 5, 10, 15, and/or 20 seconds. The telephony entity 1014 may report the media pre-warning (e.g., as a data stall hint) to cellular interface 1038 (e.g., a cellular baseband processor). Upon receiving the media pre-warning, cellular interface 1038 may take one or more actions as described above.

For example, the cellular interface 1038 may attempt an immediate service recovery if the cellular interface 1038 is in an out of service or limited service state. In such embodiments, existing periodic timers may continue to run if service is not found. As another example, the cellular interface 1038 may attempt to upgrade to a more optimal RAT (e.g., such as LTE and/or 5G NR). As a further example, the cellular interface 1038 may de-prioritize a current cell (e.g., a current LTE and/or 5G NR cell) and attempt to handover (or move) to a better (or best) performing neighbor cell (e.g., a neighbor LTE and/or neighbor 5G NR cell).

In some embodiments, which action the cellular interface 1038 chooses may be based, at least in part, on a cause of a media pre-warning (e.g., an imminent media stall hint). For example, cellular interface 1038 may attempt an immediate service discovery based, at least in part, on a media pre-warning being caused by backhaul server issues (e.g., no radio issues detected). As another example, cellular interface 1038 may attempt a RAT upgrade based, at least in part, on a media pre-warning being caused by the cellular interface 1038 being connected to a lower performing RAT. As a further example, cellular interface 1038 may attempt a handover to a neighbor cell based, at least in part, on a media pre-warning being caused by radio congestion on a current cell (e.g., a current LTE and/or 5G NR cell) and/or congestion on a cellular core network.

In some embodiments, an upgrade to a higher performing RAT (e.g., from 1× to DO to LTE and/or 5G NR) may be based on one or more triggers. In some embodiments, transmission water mark checks may be relaxed and/or ignored to allow a (immediate) RAT upgrade procedure. In some embodiments, once on LTE, at least one round of frequency list scans may be performed. In some embodiments, a RAT upgrade may not be triggered if/when a RAT upgrade has been attempted within a specified period of time (e.g., 15 seconds, 30 seconds, 1 minute, and so forth). In some embodiments, a RAT upgrade may not be triggered if/when another RAT upgrade procedure is ongoing (e.g., already triggered based on existing BSR logic). In some embodiments, ongoing out-of-service (OOS) timers may not be reset based on triggering of a RAT upgrade procedure.

In some embodiments, when a UE, such as UE 106, is in a cell dedicated channel (Cell-DCH) state, various conditions (or criteria) may be satisfied prior to attempting a RAT upgrade upon receipt of a data stall hint (and/or a media pre-warning/an imminent media stall hint). In some embodiments, a condition may be that a SIB19 message broadcast from the lower performing cell (e.g., a UMTS cell) includes higher performing (e.g., LTE and/or 5G NR) neighbor cells. In some embodiments, another condition may be that the UE was previously camped on a higher performing cell/RAT before moving to the lower performing cell/RAT (e.g., within a specified time period). For example, a UE may have fallen back from the higher performing cell/RAT to the lower performing cell/RAT for a voice call and may have been unable to upgrade back to the higher performing cell/RAT. In some embodiments, the specified time period may be on the order of minutes and/or hours. In some embodiments, another condition may be that the UE has been camped on (or connected to) the lower performing cell/RAT for a specified period of time. In some embodiments, the specified period of time may be on the order of seconds and/or minutes. In some embodiments, all of the conditions may need to be satisfied in order for the UE to attempt a RAT upgrade procedure upon receipt of a data stall hint and/or media pre-warning/imminent media stall hint. In some embodiments, at least one of the conditions may need to be satisfied in order for the UE to attempt a RAT upgrade procedure upon receipt of a data stall hint and/or media pre-warning. In some embodiments, at least two of the conditions may need to be satisfied in order for the UE to attempt a RAT upgrade procedure upon receipt of a data stall hint and/or media pre-warning. In some embodiments, additional conditions may be considered and/or required for the UE to attempt a RAT upgrade procedure upon receipt of a data stall hint and/or media pre-warning.

In some embodiments, when a UE, such as UE 106, receives of a data stall hint (and/or a media pre-warning or an imminent data stall/media stall hint) due to RACH failures and/or radio link failures (RLFs), the UE may not attempt a RAT upgrade procedure until a specified number of RACH failures and/or RLFs have been encountered. In other words, the UE may (immediately) attempt a RAT upgrade procedure upon receipt of a data stall hint and/or a media pre-warning due to RACH failures and/or RLFs when more than a threshold number of RACH failures, RLFs, and/or a combination of RACH failures and RLFs have been encountered. In some embodiments, the threshold number may be reduced and/or increased based, at least in part, on an amount of time between RACH failures and/or RLFs, e.g., the threshold number may be decreased as the amount of time decreases and/or the threshold number may be increased as the amount of time increases.

In some implementations, when a UE is in an idle mode, the UE may implement various techniques in order to avoid a particular cell. For example, in some implementations, a UE may collect random access channel (RACH) statistics for a number of previously camped on cells (e.g., in some implementations, for a last 10 cells camped on). The previously camped on cells may be saved in a database on the UE, e.g., in a bar cell database. In addition, the UE may track a number of RACH failures, IRAT attempts, and/or OOS indications for each cell and/or frequency. In some implementations, when a respective threshold is attained (e.g., a specified number of RACH failures, IRAT attempts, OOS indications, and/or some combination thereof exceeds a threshold), a corresponding cell and/or frequency within a cell may be barred (e.g., the UE will abstain from camping on the corresponding cell/frequency). In such instances, the UE may attempt to camp on other cells and/or frequencies that may have fewer (or less) issues due to RACH failure, IRAT attempts, and/or OOS indications. Additionally, the UE may bar a particular cell/frequency for a specified period of time (e.g., the UE may start a time when the particular cell/frequency is barred). In some implementations, after the specified period of time, the UE may again attempt to camp on the previously barred cell and/or frequency.

In some implementations, a UE may force a RAT upgrade to LTE/5G NR based on RACH failures and/or radio link failures (RLFs). In some implementations, the UE may check whether a SIB19 broadcasted on a 3G cell includes higher performing (e.g., LTE and/or 5G NR) neighbor cells. In such instances, in certain thresholds related to RLFs and/or RACH failures are met, the UE may deactivate a WCDMA RAT and trigger an LTE/5G NR search on a network access stratum level to attempt to upgrade RATs.

In some embodiments, such barring of cells/frequencies and/or RAT upgrades may be assisted by an application processor (AP) of a UE, such as UE 106, e.g., a processor monitoring data stall conditions. For example, in some embodiments, the AP may trigger a data stall indication to a baseband processor of the UE (e.g., inform the baseband processor of a data stall condition such as an actual detected data stall, a DNS failure, and/or a media stall pre-warning). The baseband processor may then check (or determine) whether the serving cell is in a bar database and/or has records of RLFs and/or RACH failures within a specified period of time (e.g., within the last 15 minutes, 20 minutes, 30 minutes, 45 minutes, 60 minutes, and so forth). Additionally, if the UE is in an idle and LTE/5G RN cells are broadcasted by a 3G cell (e.g., via a SIB19 message), the baseband processor may deactivate current cell and trigger a RAT upgrade procedure.

In some embodiments, a RAT upgrade may be based, at least in part, on launching of an application with low latency requirements, e.g., such as a video call and/or a streaming media application. Such behavior may be based on applications with low latency requirements being initiated on lower performing RATs having poor audio/video performance as well as extended video stalls. In other words, the UE may initiate a RAT upgrade based on launching of an application with low latency requirements to avoid poor audio/video performance as well as extended video stalls. For example, FIG. 11 illustrates various performance values for video calls initiated over LTE versus non-LTE cellular connections. For example, video calls initiated over an LTE cellular connection experience fewer audio stall conditions as compared to video calls initiated over a non-LTE cellular connection. Thus, initiating a RAT upgrade upon launch of a video call may improve call quality and/or call reliability independent of a connection used to receive a video call. In some embodiments, based on launch of an application with low latency requirements when a UE, such as UE 106, is camped on a standalone (cellular) cell, the UE may attempt a RAT upgrade via SLS scans for an LTE and/or 5G NR cell. In some embodiments, if the UE is in a 3G connected state, the UE may attempt to upgrade to LTE and/or 5G NR, e.g., via scanning for cells included in a SIB19 message. Note that in some embodiments, a RAT upgrade procedure may include a hysteresis timer to prevent excessive scanning for a RAT upgrade attempt.

Figure 12:
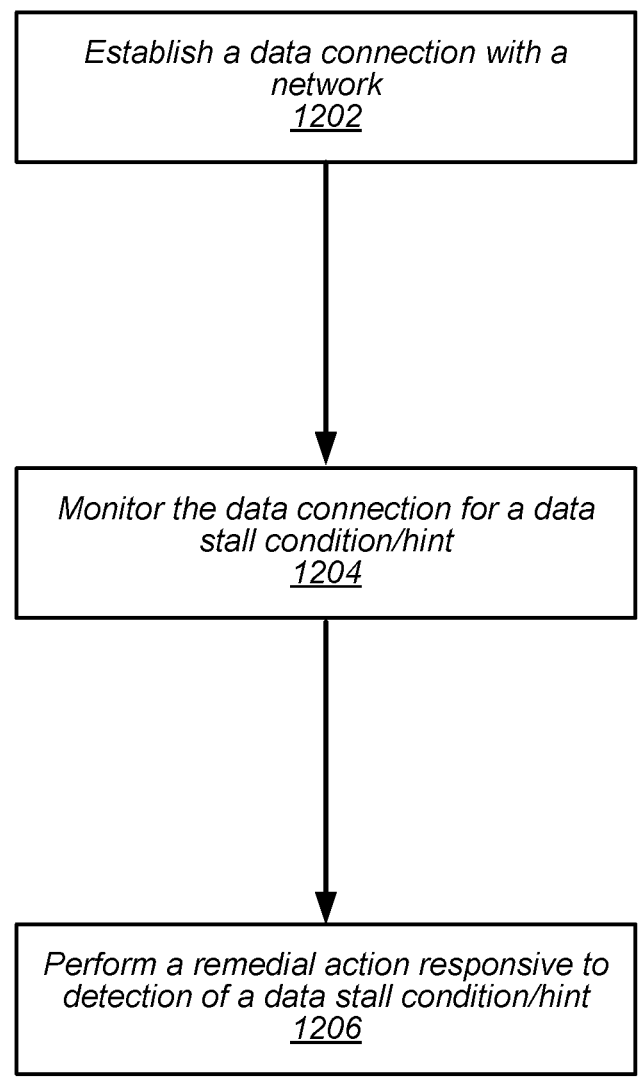
FIG. 12 illustrates a block diagram of an example of a method for a wireless device to detect and mitigate data stalls during a data connection and/or prior to establishment of a data connection with a network, according to some embodiments.

FIG. 12 illustrates a block diagram of an example of a method for a wireless device to detect and mitigate data stalls during a data connection and/or prior to establishment of a data connection with a network, according to some embodiments. The method shown in FIG. 12 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1202, a wireless device, such as UE 106, may establish a data connection(s) with a network. In some embodiments, the data connection(s) may be established over a Wi-Fi interface (radio) and/or a cellular interface (radio) of the wireless device.

At 1204, the wireless device may monitor the data connection(s) for a data stall condition(s) and/or a data stall hint(s). In some embodiments, a data stall hint may include any, any combination of, and/or all of an activation of an upper layer application while a user interface of the wireless device is in a locked state, one or more upper layer applications (e.g., launched/initiated by a user) not receiving one or more network responses to HTTP-GET queries for a specified period of time, a decrease in a size of a buffer being used for media streaming, DNS failures, initiation of an application with a low latency quality of service requirement while on a lower performing cellular connection, loss of a Wi-Fi link servicing the data connection, and/or a broken Wi-Fi backhaul (e.g., connected to a Wi-Fi access point but no valid IP address allocated). In some embodiments, network responses to HTTP-GET queries are monitored by the wireless device on a per upper layer application basis. In some embodiments, the wireless device may monitor HTTP response header timeouts to determine whether the network has responded to an HTTP-GET query.

At 1206, responsive to detection of a data stall condition(s) and/or data stall hint(s), the wireless device may perform a remedial action(s). In some embodiments, responsive to detection of a data stall condition(s) and/or data stall hint(s), the wireless device may also initiate a time, e.g., a backoff timer. In some embodiments, the wireless device may ignore subsequent (or additional) data stall condition(s) and/or data stall hint(s) until expiration of the timer.

In some embodiments, a remedial action(s) may include the wireless device initiating a service recovery of the cellular interface of the wireless device, initiating a radio access technology (RAT) upgrade procedure, and/or initiating a handover and/or re-selection procedure to a neighbor cell. In some embodiments, the remedial action(s) may be based, at least in part, on a cause (or causes) of a data stall condition(s) and/or data stall hint(s). In some embodiments, causes of a data stall condition(s) and/or data stall hint(s) may include any, any combination of, and/or all of backhaul server issues, the cellular interface of the wireless device being connected to cell operating according to a lower performing radio access technology (RAT), congestion on a current cell, congestion on a cellular core network, random access channel (RACH) procedure failures, radio link failures (RLFs), and/or initiation of an application with a low latency quality of service requirement while on a lower performing cellular connection.

In some embodiments, when the cause of the data stall condition(s) and/or data stall hint(s) includes backhaul server issues, a first remedial action may include the wireless device initiating a service recovery procedure. In some embodiments, when the cause of the data stall condition(s) and/or data stall hint(s) includes the cellular interface of the wireless device being connected to cell operating according to a lower performing radio access technology (RAT), a first remedial action may include the wireless device initiating a radio access technology (RAT) upgrade procedure. In some embodiments, when the cause of the data stall condition(s) and/or data stall(s) hint includes congestion on a current cell and/or congestion on a cellular core network, a first remedial action may include the wireless device initiating a handover and/or re-selection procedure to a neighbor cell. In some embodiments, when the cause of the data stall condition(s) and/or data stall(s) hint includes RACH procedure failures and/or RLFs, a first remedial action may include the wireless device initiating a RAT upgrade procedure. In some embodiments, when the cause of the data stall condition(s) and/or data stall(s) hint includes initiation of an application with a low latency quality of service requirement while on a lower performing cellular connection, a first remedial action may include the wireless device initiating a RAT upgrade procedure.

Data Stall Handling on LTE

In some implementations, crowded areas may experience (very) high cellular congestion as compared to less populated areas leading to high data stalls even when on a higher performing RAT such as LTE and/or 5G NR. In some embodiments, the cause for the data stalls may include cell level issues, such as congestion, as well as core network issues. In some implementations, to initiate a data session, a UE may establish a default dearer for internet traffic while camped on an LTE band with a corresponding physical cell identifier (PCI). However, if the UE encounters uplink/downlink (UL/DL) data stalls due to network congestion, network overload and/or any other network issue, there may be no technique for the UE to terminate the unsuccessful data session and attempt to camp to another LTE band/PCI unless the UE meets connected mode handover criteria. Such a scenario may lead to the UE attempting to initiate data sessions on the same camped LTE band and corresponding PCI (assuming UE does not have a mobility issue) leading to stalled data sessions and a poor user experience.

In some embodiments, based on an aggregated data stall hint (e.g., as described herein) or DNS failure hint, a baseband processor of a UE, such as UE 106, may trigger various actions, such as deactivation and/or reactivation of an internet PDN and/or a local RLF and reestablishment of an RRC connection. In some embodiments, deactivation and/or reactivation of the internet PDN may force re-establishment of the UE's context with the core network. In some embodiments, triggering a local RLF and re-establishment of the RRC connection may force re-establish of the UE's context with the RAN. In some embodiments, when (or if) multiple data stall hints are received for (or on) a current serving cell, the baseband processor of the UE may lower priority of the current serving cell, thereby allowing the UE to move to a higher or best performing neighbor cell.

In some embodiments, after an application processor detects an unsuccessful data session/stalled data session, the application processor may indicate the unsuccessful data session/stalled data session to the baseband processor. Further, after a data stall indication is received from the application processor, the baseband processor may, if there is a strong inter/intra frequency neighbor cell available, initiate an inter/intra frequency measurement report and initiate a timer. Then, if the UE receives a rrcConnecReconfig message for handover to a new PCI from the network, the UE may camp to the new PCI and continue the data session. Alternatively, if the UE does not receive a rrcConnecReconfig for handover within a duration of the time and a neighbor cell is available, the UE may terminate the current data session and exit the current serving PCI for a specified period of time and reselect (hand over) to a strongest neighbor cell based on idle mode measurement reports from intra-frequency/inter-frequency neighbors. Such a scheme may avoid data stalls and may improve the user's experience.

Figure 13:
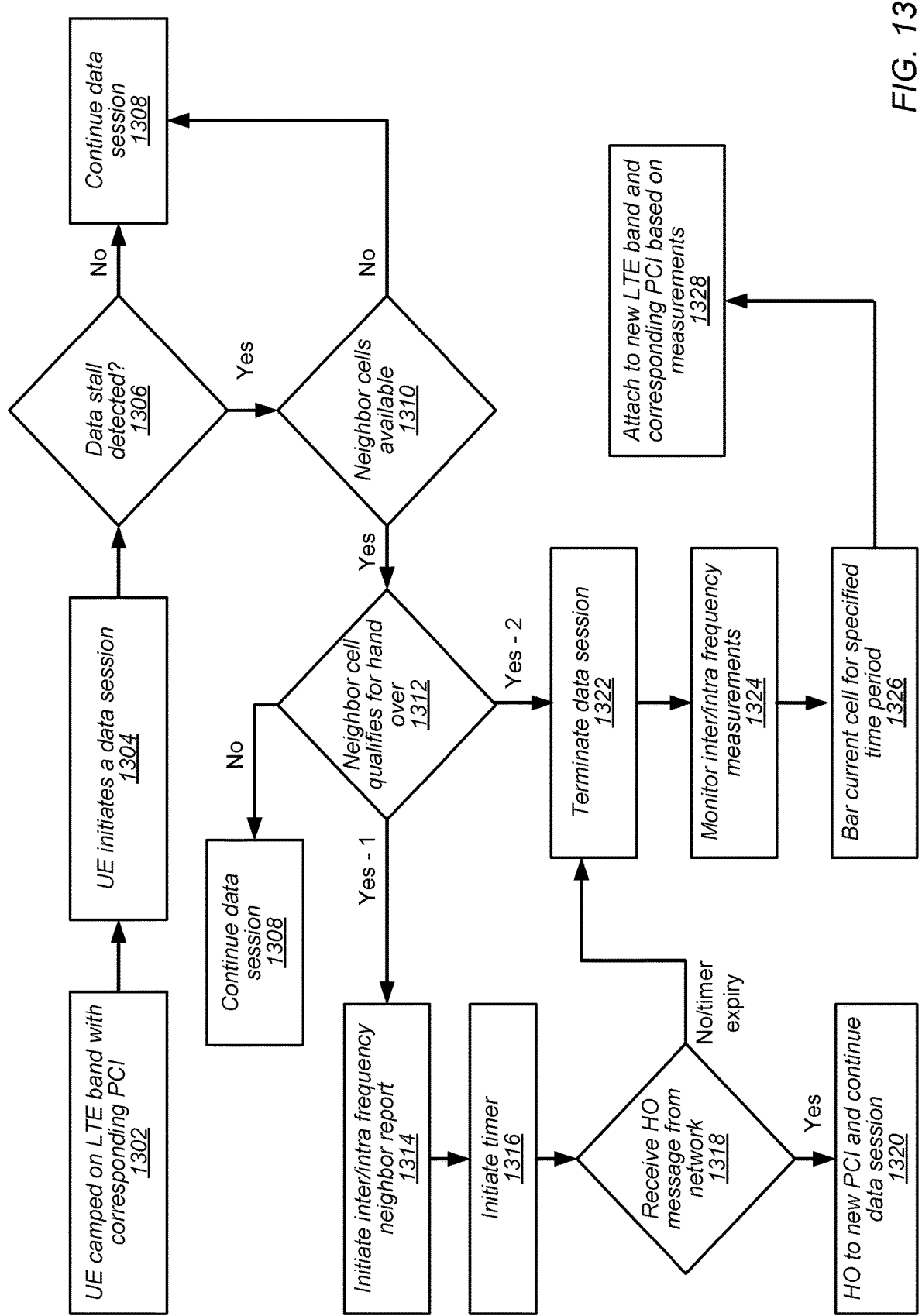
FIG. 13 illustrates a block diagram of an example of a method for avoiding data stalls while camped on an LTE cell, according to some embodiments.

FIG. 13 illustrates a block diagram of an example of a method for avoiding data stalls while camped on an LTE cell, according to some embodiments. The method shown in FIG. 13 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1302, a UE, such as UE 106, may be camped on an LTE frequency band with a corresponding physical cell identifier (PCI). At 1304, the UE may initiate (e.g., via an upper layer application), a data session. At 1306, an application processor and/or application layer of the UE may determine whether a data stall has been detected. At 1308, if no data stall has been detected, the UE may continue the data session on the LTE frequency band with the corresponding PCI. Alternatively, at 1310, if a data stall is detected (e.g., an application processor detects an unsuccessful data session/stalled data session, the application processor may indicate the unsuccessful data session/stalled data session to the baseband processor), a baseband processor of the UE may determine whether any inter-frequency and/or intra frequency neighbor cells are contained (included) in a connected mode measurement report. The UE may, if there are no neighbor cells included in the connected mode measurement report, continue the data session on the LTE frequency band with the corresponding PCI at 1308. Alternatively, at 1312, if there are neighbor cells included in the neighbor report, the baseband processor may determine whether any of the neighbor cells qualify for handover (e.g., whether any neighbor cell has a measured RSRP that exceeds a threshold for radio conditions to trigger handover). The UE may, if there are no neighbor cells that qualify for handover, continue the data session on the LTE frequency band with the corresponding PCI at 1308. Alternatively, if there are neighbor cells that qualify for handover, the UE may proceed with either of two options (e.g., Yes—1 and Yes—2). As one option, at 1314, the baseband processor may imitate an inter-frequency/intra-frequency neighbor measurement report and, at 1316, may initiate a timer for a handover procedure. At 1318, the UE may determine whether a handover message (e.g., a rrcConnecReconfig message for handover to a new PCI) has been received prior to expiration of the time. At 1320, if the handover message has been received prior to expiration of the timer, the baseband processor may initiate a handover procedure to a new PCI (e.g., indicated in the handover message) and continue the data session. Alternatively, if a handover message is not received and/or the timer expires, the UE may terminate the data session at 1322. Note that, the UE may also choose to terminate data session at 1322 in response to determining there are neighbor cells that qualify for handover at 1312. At 1324, the baseband processor may monitor inter-frequency and/or intra-frequency measurements, e.g., in an RRC idle mode. At 1326, the baseband processor may bar the current service cell for a specified period of time. At 1328, the baseband processor may initiate an attachment procedure to attach to a new LTE band and corresponding PCI based on the inter-frequency and/or intra-frequency measurements at 1324.

Figure 14:
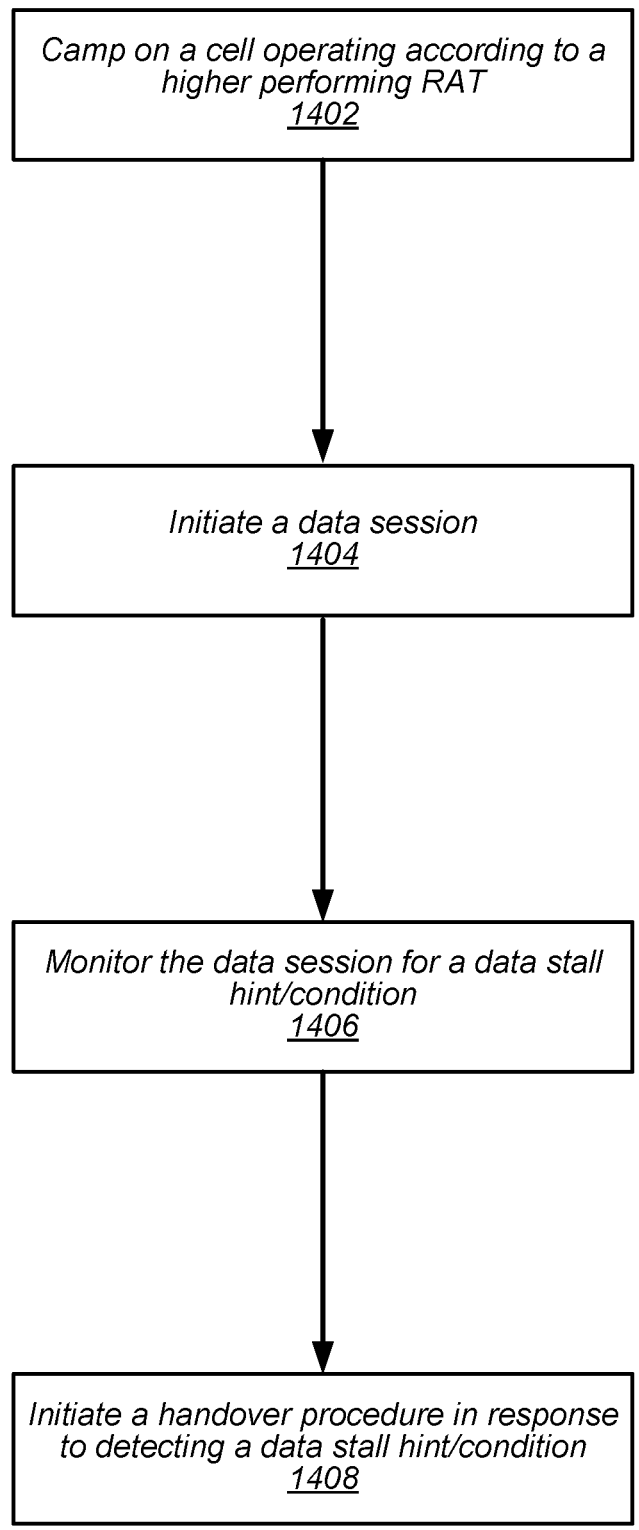
FIG. 14 illustrates a block diagram of an example of a method for a wireless device to detect and/or mitigate data stalls for a data connection while on a higher performing radio access technology (RAT), according to some embodiments.

FIG. 14 illustrates a block diagram of an example of a method for a wireless device to detect and/or mitigate data stalls for a data connection while on a higher performing radio access technology (RAT), according to some embodiments. The method shown in FIG. 14 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 1402, one or more data sessions may be initiated with a network by a wireless device, such as UE 106. In some embodiments, the data connection(s) may be established over a Wi-Fi interface (radio) and/or a cellular interface (radio) of the wireless device. In some embodiments, the wireless device may be camped on a cell operating according to a higher performing RAT. In some embodiments, the higher performing RAT may be one of Long Term Evolution (LTE) or Fifth Generation New Radio (5G NR). In some embodiments, the cell may be associated with a first physical cell identifier (PCI);

At 1404, the wireless device may monitor the one or more data for a data stall hint and/or a data stall condition. In some embodiments, a data stall hint may include any, any combination of, and/or all of an activation of an upper layer application while a user interface of the wireless device is in a locked state, one or more upper layer applications (e.g., launched/initiated by a user) not receiving one or more network responses to HTTP-GET queries for a specified period of time, a decrease in a size of a buffer being used for media streaming, DNS failures, initiation of an application with a low latency quality of service requirement while on a lower performing cellular connection, loss of a Wi-Fi link servicing the data connection, and/or a broken Wi-Fi backhaul (e.g., connected to a Wi-Fi access point but no valid IP address allocated). In some embodiments, network responses to HTTP-GET queries are monitored by the wireless device on a per upper layer application basis. In some embodiments, the wireless device may monitor HTTP response header timeouts to determine whether the network has responded to an HTTP-GET query.

At 1406, responsive to determining a neighbor cell meets at least one handover condition and detection of a data stall hint and/or data stall condition, the wireless device may initiate a handover procedure to the neighbor cell. In some embodiments, determining the neighbor cell meets at least one handover condition may include the wireless device determining the neighbor cell is included as an inter-frequency and/or intra frequency neighbor cell in a connected mode measurement report and determining that the neighbor cell has a measured received signal received power (RSRP) that exceeds a threshold for radio conditions to trigger a handover. In some embodiments, the connected mode measurement report may include a rrcConnecReconfig message.

In some embodiments, initiating a handover and/or re-selection procedure to the neighbor cell may include the wireless device initiating an inter-frequency/intra-frequency measurement report and initiating a handover (or re-selection) timer. In such embodiments, the wireless device may initiate, responsive to receiving a handover message from the cell prior to expiration of the handover timer, a handover procedure to a new PCI as indicated by the handover message and may continue the data session on the new PCI. In some embodiments, the wireless device may, responsive to determining that a handover message has not been received from the cell prior to expiration of the handover timer, terminate the data session, monitor inter-frequency/intra-frequency measurements while in a radio resource control (RRC) idle mode, bar the cell for a specified period of time, and initiate an attachment procedure to attach to a new cell and corresponding PCI based on the inter-frequency and/or intra-frequency measurements. Additionally, the wireless device may initiate a new data session on the corresponding PCI.

In some embodiments, initiating a handover and/or re-selection procedure to the neighbor cell may include the wireless device monitoring inter-frequency/intra-frequency measurements while in a radio resource control (RRC) idle mode, barring the cell for a specified period of time, initiating an attachment procedure to attach to a new cell and corresponding PCI based on the inter-frequency and/or intra-frequency measurements, and initiating a new data session on the corresponding PCI.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
   at least one antenna;
   at least one radio, wherein the at least one radio is configured to perform cellular communication using at least one radio access technology (RAT);
   one or more processors coupled to the at least one radio, wherein the one or more processors and the at least one radio are configured to perform voice and/or data communications; wherein the one or more processors are configured to cause the UE to
   establish a data connection with a network via one of a Wi-Fi interface or a cellular interface;
   monitor the data connection for a data stall condition and/or data stall hint; and
   perform, responsive to detection of a data stall condition and/or data stall hint, at least one remedial action, wherein a first remedial action of the at least one remedial action includes initiating a handover procedure to a neighbor cell, and wherein, when a cause of the data stall condition includes non-radio errors or failures, the first remedial action further includes initiating a service recovery procedure.

2. The UE of claim 1,
   wherein a data stall hint includes one or more of:
   an activation of an upper layer application while a user interface of the UE is in a locked state;
   one or more upper layer applications launched by a user not receiving one or more network responses to Hypertext Transport Protocol (HTTP) GET queries for a specified period of time;
   a decrease in a size of a buffer being used for media streaming; or
   initiation of an application with a quality of service requirement while on a cellular connection whose performance cannot guarantee a latency requirement associated with the quality of service; and
   wherein a data stall condition includes one or more of:
   domain name server (DNS) failures;
   loss of a Wi-Fi link servicing the data connection; or
   a broken Wi-Fi backhaul.

3. The UE of claim 2,
   wherein network responses to HTTP-GET queries are monitored by the UE on a per upper layer application basis.

4. The UE of claim 2,
   wherein the one or more processors are further configured to cause the UE to:
   monitor HTTP response header timeouts to determine whether the network has responded to an HTTP-GET query.

5. The UE of claim 1,
   wherein the at least one remedial action is based, at least in part, on a cause of a data stall condition and/or data stall hint, and wherein the cause of a data stall condition includes one or more of:
   non-radio errors or failures;
   the cellular interface of the UE being connected to a cell operating according to a lower performing radio access technology (RAT);
   congestion on a current cell;
   congestion on a cellular core network;
   random access channel (RACH) procedure failures;
   radio link failures (RLFs); or
   initiation of an application with a low latency quality of service requirement while on a lower performing cellular connection.

6. The UE of claim 5,
   wherein, when the cause of the data stall condition includes non-radio errors or failures, the first remedial action further includes initiating a service recovery procedure;
   wherein, when the cause of the data stall condition includes the cellular interface of the UE being connected to a cell operating according to a lower performing RAT, the first remedial action further includes the UE initiating a RAT upgrade procedure;
   wherein, when the cause of the data stall condition includes RACH procedure failures and/or RLFs, the first remedial action further includes the UE initiating a RAT upgrade procedure; and
   wherein, when the cause of the data stall condition includes initiation of an application with a quality of service requirement while on a cellular connection whose performance cannot guarantee a latency requirement associated with the quality of service, the first remedial action further includes the UE initiating a RAT upgrade procedure.

7. The UE of claim 1,
   wherein the one or more processors are further configured to cause the UE to:
   initiate, responsive to detection of a data stall condition and/or data stall hint, a timer; and
   ignore subsequent data stall conditions and/or data stall hints until expiration of the timer.

8. An apparatus, comprising:
   a memory; and
   at least one processor in communication with the memory;
   wherein the at least one processor is configured to:
   camp on a cell operating according to a higher performing radio access technology (RAT), wherein the higher performing RAT comprises one of Long Term Evolution (LTE) or Fifth Generation New Radio (5G NR), and wherein the cell is associated with a first physical cell identifier (PCI);
   generate instructions to initiate one or more data sessions;
   monitor the one or more data sessions for a data stall hint and/or data stall condition; and
   responsive to determining a neighbor cell meets at least one handover condition and detection of a data stall hint and/or data stall condition, initiate a handover to the neighbor cell, and wherein, when a cause of the data stall condition includes non-radio errors or failures, the at least one processor is further configured to initiate a service recovery procedure.

9. The apparatus of claim 8,
wherein, to determine the neighbor cell meets at least one handover condition, the at least one processor is further configured to:
- determine the neighbor cell is included as an inter-frequency and/or intra frequency neighbor cell in a connected mode measurement report; and
- determine that the neighbor cell has a measured received signal received power (RSRP) that exceeds a threshold for radio conditions to trigger a handover.

10. The apparatus of claim 9,
wherein the connected mode measurement report includes a rrcConnecReconfig message.

11. The apparatus of claim 8,
wherein, to initiate the handover procedure to the neighbor cell, the at least one processor is further configured to:
- generate instructions to initiate an inter-frequency/intra-frequency measurement report; and
- generate instructions to initiate a handover timer.

12. The apparatus of claim 11,
wherein the at least one processor is further configured to:
- generate instructions to initiate, responsive to receiving a handover message from the cell prior to expiration of the handover timer, a handover procedure to a new PCI as indicated by the handover message; and
- continue the one or more data sessions on the new PCI.

13. The apparatus of claim 11,
wherein the at least one processor is further configured to:
- terminate, responsive to determining that a handover message has not been received from the cell prior to expiration of the handover timer, the one or more data sessions;
- monitor inter-frequency/intra-frequency measurements while in a radio resource control (RRC) idle mode;
- bar the cell for a specified period of time;
- generate instructions to initiate an attachment procedure to attach to a new cell and corresponding PCI based on the inter-frequency and/or intra-frequency measurements; and
- generate instructions to initiate a new data session on the corresponding PCI.

14. The apparatus of claim 8,
wherein, to generate instructions to initiate a handover procedure to the neighbor cell, the at least one processor is further configured to:
- monitor inter-frequency/intra-frequency measurements while in a radio resource control (RRC) idle mode;
- bar the cell for a specified period of time;
- generate instructions to initiate an attachment procedure to attach to a new cell and corresponding PCI based on the inter-frequency and/or intra-frequency measurements; and
- generate instructions to initiate a new data session on the corresponding PCI.

15. The apparatus of claim 8,
wherein a data stall hint includes one or more of:
- an activation of an upper layer application while a user interface in communication with the apparatus is in a locked state;
- one or more upper layer applications launched by a user not receiving one or more network responses to Hypertext Transport Protocol (HTTP)GET GET queries for a specified period of time;
- a decrease in a size of a buffer being used for media streaming; or
- initiation of an application with a low latency quality of service requirement while on a lower performing cellular connection; and wherein a data stall condition includes one or more of:
- domain name server (DNS) failures; or
- loss of a Wi-Fi link servicing the one or more data sessions.

16. The apparatus of claim 15,
wherein network responses to HTTP-GET queries are monitored by the apparatus on a per upper layer application basis; and wherein the at least one processor is further configured to:
- monitor HTTP response header timeouts to determine whether a network has responded to an HTTP-GET query.

17. The apparatus of claim 8,
wherein, to generate instructions to initiate the handover procedure to the neighbor cell, the at least one processor is further configured to perform at least one of:
- forcing re-establishment of a context with a core network via deactivation and/or reactivation of an internet packet data network (PDN);
- forcing re-establishment of a context with a radio access network (ran) via triggering of a local radio link failure (RLF) and re-establishment of a radio resource control (RRC) connection; or
- triggering a handover to the neighbor cell via lowering of a priority of the cell.

18. A non-transitory computer readable memory medium storing program instructions executable by processing circuitry to cause a user equipment device (UE) to:
- establish a data connection with a network via one of a Wi-Fi interface or a cellular interface;
- monitor the data connection for a data stall condition and/or data stall hint; and
- perform, responsive to detection of a data stall condition and/or data stall hint, at least one remedial action, wherein a first remedial action of the at least one remedial action includes initiating a handover procedure to a neighbor cell, and wherein, when a cause of the data stall condition includes non-radio errors or failures, the first remedial action further includes initiating a service recovery procedure.

19. The non-transitory computer readable memory medium of claim 18,
wherein, when the cause of the data stall condition and/or data stall hint includes at least one of the cellular interface of the UE being connected to cell operating according to a lower performing RAT, random access channel (RACH) procedure failures and/or radio link failures (RLFs), or initiation of an application with a quality of service requirement while on a cellular connection whose performance cannot guarantee a latency requirement associated with the quality of service, the first remedial action further includes initiating a RAT upgrade procedure.

20. The non-transitory computer readable memory medium of claim 18,
wherein a data stall hint includes one or more of:
- an activation of an upper layer application while a user interface of the UE is in a locked state;
- one or more upper layer applications launched by a user not receiving one or more network responses to Hypertext Transport Protocol (HTTP) GET queries for a specified period of time;
- a decrease in a size of a buffer being used for media streaming; or initiation of an application with a quality of service requirement while on a cellular connection whose performance cannot guarantee a latency requirement associated with the quality of service; and
wherein a data stall condition includes one or more of:
  domain name server (DNS) failures;
  loss of a Wi-Fi link servicing the data connection; or
  a broken Wi-Fi backhaul.

\* \* \* \* \*